(12) United States Patent
Zulfiquar

(10) Patent No.: US 12,546,676 B2
(45) Date of Patent: Feb. 10, 2026

(54) APPARATUS AND METHOD FOR THE DETECTION OF PROPERTIES OF A PIPE

(71) Applicant: Datatecnics Corporation LTD, Birmingham (GB)

(72) Inventor: Suhayl Zulfiquar, Birmingham (GB)

(73) Assignee: Datatecnics Corporation LTD, Birmingham (GB)

( * ) Notice: Subject to any disclaimer, the term of this patent is extended or adjusted under 35 U.S.C. 154(b) by 386 days.

(21) Appl. No.: 17/759,444

(22) PCT Filed: Jan. 27, 2021

(86) PCT No.: PCT/GB2021/050189
§ 371 (c)(1),
(2) Date: Jul. 26, 2022

(87) PCT Pub. No.: WO2021/152306
PCT Pub. Date: Aug. 5, 2021

(65) Prior Publication Data
US 2023/0086733 A1 Mar. 23, 2023

(30) Foreign Application Priority Data
Jan. 27, 2020 (GB) .................................. 2001136

(51) Int. Cl.
*G01M 3/28* (2006.01)
*G01B 7/16* (2006.01)
*G01L 9/02* (2006.01)
*G01L 19/00* (2006.01)
*G01L 19/14* (2006.01)

(52) U.S. Cl.
CPC ............. *G01M 3/2815* (2013.01); *G01B 7/16* (2013.01); *G01L 9/025* (2013.01); *G01L 19/0092* (2013.01); *G01L 19/147* (2013.01)

(58) Field of Classification Search
CPC ......... G01M 3/2815; G01B 7/16; G01B 7/20; G01L 9/025; G01L 19/0092; G01L 19/147; G01L 19/0654; G01L 19/14; G01K 1/143; G01D 11/30; G01D 11/245; G01D 11/305
See application file for complete search history.

(56) References Cited

U.S. PATENT DOCUMENTS

| 10,215,011 B2* | 2/2019 | Trillon ................... G01N 29/11 |
| 10,605,686 B2* | 3/2020 | Pusheck ................... B60R 11/00 |
| 10,663,093 B2* | 5/2020 | Lennon ................. F16L 13/146 |
| 10,782,161 B2* | 9/2020 | Silverman ............ G01N 29/223 |
| 11,262,247 B1* | 3/2022 | Cardwell ............... G01K 1/143 |
| 11,287,291 B1* | 3/2022 | Cardwell ............ G01M 17/007 |

(Continued)

*Primary Examiner* — Freddie Kirkland, III
(74) *Attorney, Agent, or Firm* — Woodard, Emhardt, Henry, Reeves & Wagner, LLP

(57) ABSTRACT

Apparatus and Method for the Detection of Properties of a Pipe There is described herein a system for determining one or more properties of a pipe, the system comprising an attachment pad, at least one sensor configured to be coupled to the outside of a pipe wall, wherein the attachment pad is configured to overlie one or more of the at least one sensor such that the one or more sensor may be positioned between the pipe and the attachment pad, and to prevent slippage of the one or more sensor on the pipe. There is also described an attachment pad, a sensor, and a pipe.

20 Claims, 19 Drawing Sheets

(56) References Cited

U.S. PATENT DOCUMENTS

| | | | | |
|---|---|---|---|---|
| 2002/0062958 | A1* | 5/2002 | Diener | E21B 47/017 |
| | | | | 166/250.11 |
| 2015/0330206 | A1* | 11/2015 | Trillon | G01N 29/04 |
| | | | | 29/428 |
| 2016/0370212 | A1* | 12/2016 | Silverman | G01D 11/30 |
| 2017/0089496 | A1* | 3/2017 | Lennon | F16L 13/146 |
| 2018/0106140 | A1* | 4/2018 | Barrilleaux | E21B 43/101 |
| 2023/0366705 | A1* | 11/2023 | Zulfiquar | G01B 5/30 |

* cited by examiner

60

APPARATUS AND METHOD FOR THE DETECTION OF PROPERTIES OF A PIPE

FIELD OF INVENTION

The invention is in the field of the measurement of properties of pipes to determine their health condition. Pipes are often in subterranean environments, and the invention may be particularly advantageous in such environments.

BACKGROUND

Pipelines are highly useful fluid transportation systems. For example oil pipes may be used to transport oil around the world. Gas is similarly transported in pipes. Moreover, water is another fluid that is transported with pipes. Water pipes are particularly interesting as the value of the fluid is relatively low, but is essential to agriculture and for drinking supply for local populations. Due to the relatively low monetary value of water, water pipes are often less well maintained as there are fewer resources spent on such pipes. These pipes are often aged, and often have large amount of leaks, which results in a large amount of lost water. Monitoring such pipes in a cost effective way is therefore advantageous. Pipes are also very difficult to monitor given their length and the sought-after nature of the commodities within them.

Fibre optic cables have been used to monitor the properties of pipes, however such systems are costly and difficult to implement. Therefore there is a need for an alternative system that is more cost effective to implement.

Present strain gauges are also known as apparatus to monitor the strain of various surfaces. However, at present many strain gauges are notorious for being liable to breakage. They are often difficult to attach to the surface being measured. Moreover, in environments where they cannot readily be replaced, and where they may be subject to high pressures, and large fluctuations in temperature, present strain gauges are not well suited. A new sensor that may be in the form of a strain gauge is desired that addresses at least one, or alternatively all, of the shortcomings listed above.

SUMMARY OF INVENTION

Aspects of the present invention are set out in the independent claims. Optional features are set out in the dependent claims.

According to a first aspect there is an attachment pad configured to prevent the ingress of moisture into the vicinity of a sensor attached to a pipe, the attachment pad configured to overlie one or more sensors such that the one or more sensors may be positioned between the pipe and the attachment pad. This is advantageous as it may protect a sensor from the environment in which the pipe is located. For example in a subterranean environment the attachment pad may provide mechanical protection to the sensor from soil, sharp debris, stones and anything else that might contaminate or physically damage that sensor.

Optionally, the attachment pad having a first face, a second face, and wherein the first face comprises an indent configured to house at least one sensor when the at least one sensor is coupled to the pipe. The indent may further reduce the pressure applied to the sensor during use.

Optionally, the second face of the attachment pad having a raised portion, aligned with the indent. This allows the thickness of the attachment pad to be substantially uniform to allow the pressure to de dissipated evenly.

Optionally, the attachment pad has a thickness of 1 mm, preferably the thickness being in the range of 1 mm to 10 mm, preferably 6 mm. This thickness may provide additional protection to the sensor. This range of thicknesses may enable ease of installation of the attachment pad. This thickness may also make process of adhering the attachment pad less time consuming.

Optionally, the attachment pad is formed of a resilient material, such that the attachment pad is more resilient than the sensor. This is advantageous as the attachment pad may protect the sensor through its resilience.

Optionally, one or more attachment pads are sufficient to span the entire perimeter of the pipe. Advantageously this ensures that the section of the pipe is entirely covered so that the forces on the pipe are uniform in all directions.

Optionally, the one or more attachment pads span the pipe once but only once. Advantageously this keeps the thickness of the attachment pads on the pipe constant so that forces on the pipe are equal across the entire perimeter of the pipe.

Optionally, the attachment pad is tessellatable with itself such that two or more attachment pads may span the entire perimeter of the pipe. This enables a single size pad to be used for various pipes of differing circumference.

Optionally, the attachment pad is configured to be adhered to the pipe by adhesive, and/or wherein the attachment pad is curable/weldable to adhere to the pipe. Electrofusion welding for example may be used. This enables the attachment pad to be adhered to the pipe in an easy and reproducible manner.

Optionally, the attachment has a sufficient level of friction with the pipe such that adherence between the pipe and the attachment pad is caused. This is advantageous as it allows the pad to be adhered without the need for adhesive, making the installation simpler.

Optionally, wherein the attachment pad is configured to house an analogue to digital converter configured to convert an analogue signal measured by the sensor into a digital signal.

According to a second aspect there is a sensor for measuring a parameter of a pipe, the sensor comprising a flexible plastic, or metallised plastic, base layer, an ink trace forming an electronic circuit for measuring at least one parameter, preferably a protective layer encasing the ink trace, wherein the sensor has a poisons ratio of 0.35 to 0.45 such that the sensor is configured to elastically deform under dynamic short term loading, as well as through gradual changes to loading through for example the compaction of soil. This is advantageous as it allows ease of installation of the sensor, as it may be handled without a large amount of care, and it may be attached easily to many surfaces. The flexibility may also be particularly good at withstanding the pressure of subterranean environments. Poisson values in the range 0.37 to 0.44 May be particularly advantageous, and a value of 0.44 is even more advantageous.

Optionally, the sensor is configured to measure at least one property of the pipe. This allows features of the pipe to be analysed to check the health of the pipe, and the likelihood of failure.

Optionally, the sensor is configured to measure at least one of strain, temperature, humidity, pressure and acceleration. Strain may allow the likelihood of a fracture to be identified. Temperature may also measure the likelihood of damage from the elements, for example from freeze/thaw. Acceleration may give an indication of any movement of the pipe, or if there is a blockage inside the pipe. Humidity may help understand variability of soil condition leading to irregular loading. Pressure may allow an understanding of the level of load being applied and how this changes over time.

Optionally, at least four sensors are coupled to the pipe, such that the two sensors closest the top of the pipe are equidistant to the top of the pipe. This may enable to a particularly effective form of measurement.

Optionally, the sensor is configured to measure strain in two axis that are perpendicular to one another. This advantageously allows both axial and circumferential strain to be measured. An optional alternative may to measure the strain in an axis, and to measure the strain at another axis at forty five degrees to the first axis, such that the two axis are diagonal from one another.

Optionally, the sensor comprises two measurement modules positioned perpendicular to one another. This advantageously enables simple measurement of both the axial and circumferential strain.

According to a third aspect there is a system for determining one or more properties of a pipe, the system comprising an attachment pad, at least one sensor configured to be coupled to the outside of a pipe wall, wherein the attachment pad is configured to overlie one or more of the at least one sensor such that the one or more sensor may be positioned between the pipe and the attachment pad, and to prevent slippage of the one or more sensors on the pipe. The system may be particularly effective at measuring the properties of a pipe in a cost effective way to enable the health condition of a pipe to be determined. The sensor is also sufficiently protected such that it is less likely to fail, and so reducing the frequency at which the sensor may be needed to be replaced.

Optionally, at least three sensors are coupled to the pipe, and further wherein the top of the pipe nearest the ground is free from a sensor, such that it may be accessed for maintenance, and wherein the sensors are equidistant from each other around the circumference of the pipe. This is advantageous as engineers often have to tap into the top of the pipe in order to enter the pipe to perform maintenance.

Optionally the system further comprising a data acquisition module configured to be in communication with at least one sensor to receive data, the data acquisition module configured to process the data to determine one or more properties of the pipe. This advantageously enables the data from the sensors to be analysed.

Optionally the system further comprising a plurality of sensors connected to the data acquisition module, wherein the sensors are connected to the data acquisition module by at least one of: direct connections between the plurality of sensors and the data acquisition module, wherein the direct connections are in parallel with one another, direct connections between the plurality of sensors and the data acquisition module, wherein the direct connections are in series with one another, connections between the plurality of sensors and the data acquisition module, wherein said connections are via a connecting element, and wherein the connections between the plurality of sensors and the connecting element are in parallel with each other; or connections between the plurality of sensors and the data acquisition module, wherein said connections are via a connecting element, and wherein the connections between the plurality of sensors and the connecting element are in series with each other.

Optionally, the system further comprising a junction box configured to be connected to the at least one sensor, such that data measured by the sensor can be communicated to the junction box. Advantageously the junction box allows all of the sensors to connect to a single point, such that the connections are less likely to be caught by a subterranean environment.

Optionally, the data acquisition module is configured to be in direct communication with the junction box. Advantageously this enables all of the data to reach the data acquisition module in a single connection.

Optionally, in use the junction box is positioned at least far enough away from the sensor so that the junction box does not cause stress or strain on the pipe, and is positioned close enough to the sensor such that noise is not introduced into the signal. This is highly advantageous as it reduces the chance of the measurement system damaging the pipe itself, whilst ensuring the accuracy of the data collected.

Optionally, in use the junction box is positioned between 0.5 m and 1.5 m away from the sensor. These values may be particularly advantageous for protecting the pipe, and ensuring accurate data protection.

Optionally, the data acquisition module is housed within a meter chamber. This may protect the data acquisition module from the subterranean environment.

Optionally, the meter chamber is machined to make cable accessibility straightforward, and is configured to be weatherproof, such that the data acquisition module is not affected by groundwater. Advantageously this protects the data acquisition module.

Optionally, the meter chamber further comprises a power subsystem to power the data acquisition module. This enables the data acquisition module to be powered locally.

Optionally, the system further comprises a pressure sensor configured to be tapped into the pipe in the vicinity of at least one sensor, to determine the pressure of fluid in the pipe. The pressure in the vicinity of the sensors may be advantageous as it may provide an understanding of hydraulic activity and its subsequent effect on the pipe.

According to a further aspect there is a method of installing at least one sensor on a pipe, comprising attaching the one or more of the at least one sensors of the second aspect to the pipe, and overlaying at least one of the one or more sensors, with the attachment pad of the first aspect. This advantageously enables a quick and easy installation method.

Optionally, the method further comprising curing the one or more sensors such that the at least one sensor couples to the pipe wall. Advantageously this increases the bond between the sensor and the pipe.

Optionally, the curing comprises applying a pressure for a set period of time, and/or wherein curing comprises applying heat for a set period of time. Advantageously, this enables the bond between the sensor and the pipe to be strong.

Optionally, the method further comprising curing the one or more attachment pads to permanently couple the attachment pads to the pipe wall. This is advantageous as it allows the attachment pads to have a secure bond to the pipe wall.

Optionally, curing comprises applying a pressure for a set period of time, and/or wherein curing comprises applying heat for a set period of time. This is advantageous for the reasons set out above.

Optionally, the method further comprising connecting the one or more sensors to a data acquisition module. This enables the data to be analysed effectively so that any faults in the pipe may be found.

Optionally, connecting the one or more sensors to a data acquisition module comprises connecting the one or more sensors to a junction box, and then connecting the junction box to a meter chamber containing a data acquisition module. This enables the connections to be secure, and to ensure the cables are at less risk of damage.

Optionally, attaching the one or more sensors to the pipe comprises positioning the at least one sensor correctly in both the longitudinal and circumferential axis. This ensures that the calculations to determine axial strain and circumferential strain are simpler and so require less processing power.

Optionally, attaching the one or more sensors to the pipe comprises attaching the one or more sensors to the outer surface of the pipe with an adhesive or epoxy, or by curing/welding, for example electrofusion welding. This may advantageously allow a quick and easy bond to be formed.

A further aspect comprises a pipe for transporting fluids, the pipe extending from a distal point, to a proximal point, wherein the pipe is configured for fluid to flow through the pipe from the distal point to the proximal point, wherein the pipe comprises a pipe wall comprising an inside surface, and an outside surface, and wherein a lumen is encapsulated by the inside surface of the pipe wall such that fluid may flow through the lumen, and further wherein the pipe is coupled to the sensor of the second aspect, and to the attachment pad of the first, such that the sensor may be positioned between the pipe and the attachment pad. Advantageously this secures a sensor to a pipe such that it may monitor various aspects of the pipe to determine faults.

BRIEF DESCRIPTION OF FIGURES

FIG. 14 is a cross-sectional view along the length of the pipe.

DETAILED DESCRIPTION

The Figures are described below, and each Figure is merely an illustration of an embodiment. The features shown in the Figures are not considered essential unless otherwise stated.

Figure 1:
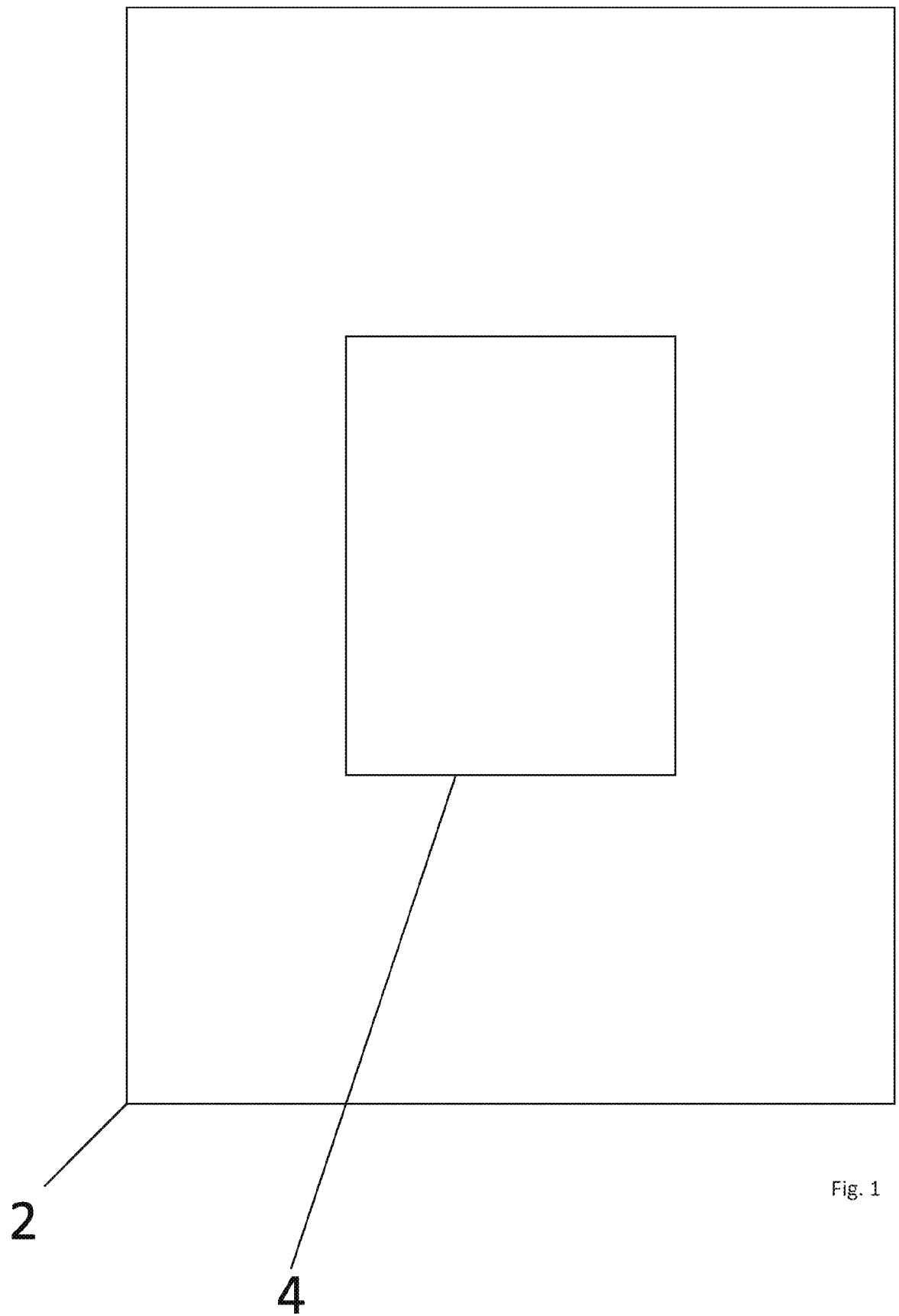
FIG. 1 shows a plan view of the attachment pad from above.

FIG. 1 shows an attachment pad 2. The attachment pad 2 is viewed from an orientation that is applied face down to the pipe, such that the length and width of the attachment pad 2 are shown, but the depth of the attachment pad 2 is not. FIG. 1 shows an indent 4 protruding into the face of the attachment pad 2 exposed to the subterranean environment.

The attachment pad 2 is configured to prevent the ingress of moisture and dirt into the vicinity of a sensor attached to a pipe, and to overlie one or more sensors such that the one or more sensors may be positioned between the pipe and the attachment pad 2.

The indent 4 shown in FIG. 1 is configured to overlie the one or more sensors. The indent 4 in FIG. 1 is shown as being in a substantially central position within the attachment pad 2. This may allow for strain to be evenly distributed. However, the indent may be positioned off-centre for other reasons, such as positioning of the sensor on the pipe.

The attachment pad 2 may be formed of a resilient material, such that the attachment pad 2 is more resilient than the sensor. This may enable the attachment pad 2 to withstand higher forces, pressures, or temperatures than the sensor could withstand on its own. The attachment pad 2 may therefore protect the sensors housed therein from such forces though its resilience.

Figure 2:
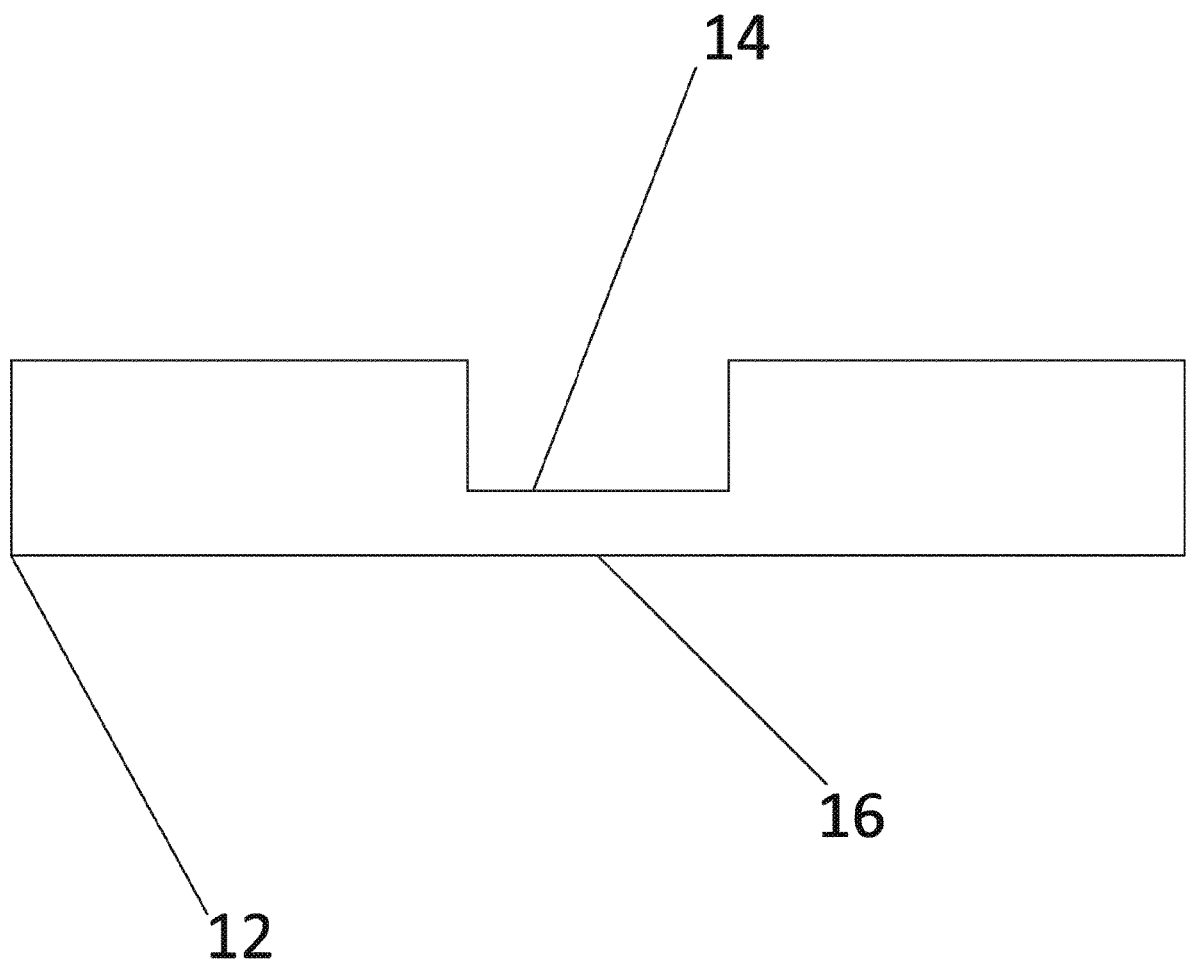
FIG. 2 shows a cross-sectional view of the attachment pad through the indent region.

FIG. 2 shows a cross-section of the attachment pad 12. The depth and length of the attachment pad 12 are visible, but not its width. The indent 14 shown in FIG. 1 is visible in FIG. 2. In FIG. 2 the side opposite the indent is flush 16. However in other embodiments a raised portion may also be present. The raised portion may be aligned with the indent 14. FIG. 2 shows that in some embodiments the thickness of the attachment pad 12 is constant throughout the length of the attachment pad 12. The attachment pad may have a thickness of at least 1 mm, and more preferably a thickness of between 1 mm and 10 mm, or 1 to 6 mm.

Figure 3:
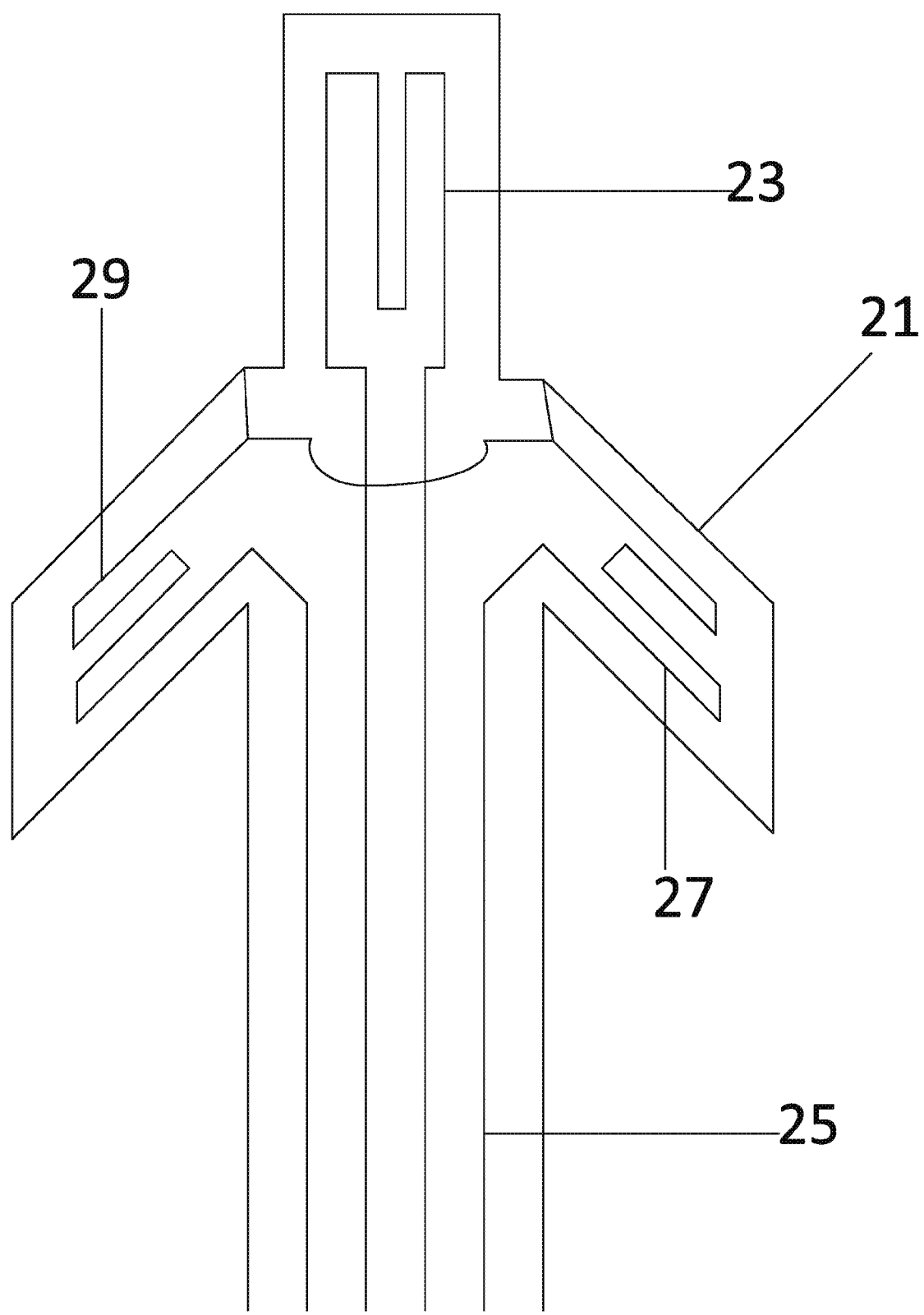
FIG. 3 shows a sensor with three measurement modules in a triangular arrangement.

FIG. 3 shows one embodiment of the circuitry 25 provided within the sensor 21. FIG. 3 shows an embodiment with three sensor elements 21, 27, 29 shown. Each sensor element may be a strain gauge to monitor the shear stress at a 45 degree angle. FIG. 3 shows a triangular-like distribution of the sensor elements around the sensor 21. Four channels are present, three are which are associated with each of the sensor elements. The sensor 21 may be formed by printing the circuitry 25 directly on to the base layer. For example conductive ink may be used to form the circuitry 25.

The three sensor elements may allow both the axial and circumferential strain to be measured. For example, the central sensor 23 element may be positioned so as to measure axial strain. Both of the outer sensor elements 27, 29 may be used to measure the circumferential strain. For example the outer elements 27, 29 may be positioned to directly measure circumferential strain alone, or as shown, the elements may be positioned to measure a mixture of both circumferential and axial strain. Using the measurements form the central sensor element the circumferential strain alone may then be measured. There may also be benefits to measuring off the axis of the circumferential strain, in a diagonal direction, as this may detect any strain events associated with helically applied loads.

Figure 4:
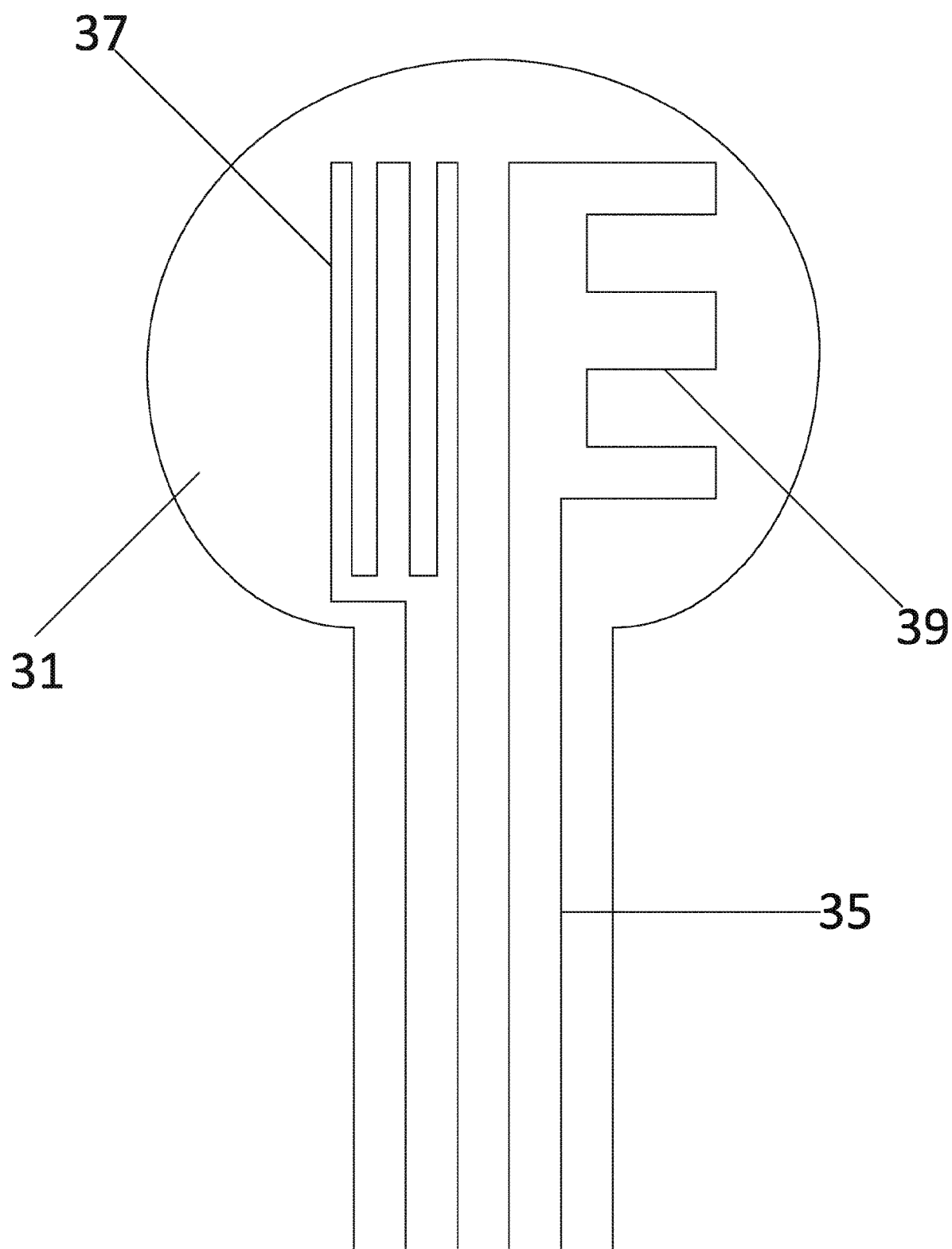
FIG. 4 shows a sensor with two measurement modules in a circular arrangement.

FIG. 4 shows an alternative embodiment with just two sensor elements 37, 39. There are three channels, two of which are associated with each of the sensor elements. The two sensor elements 37, 39 are arranged perpendicular to each other. The left sensor element 37 may be positioned to measure axial strain, and the right sensor element 39 may be configured to measure circumferential strain. These can be measured directly without the need for further calculation, thus reducing error. The third channel around the perimeter may be arranged into a circular shape, as shown in FIG. 4, or into any other shape.

Figure 5:
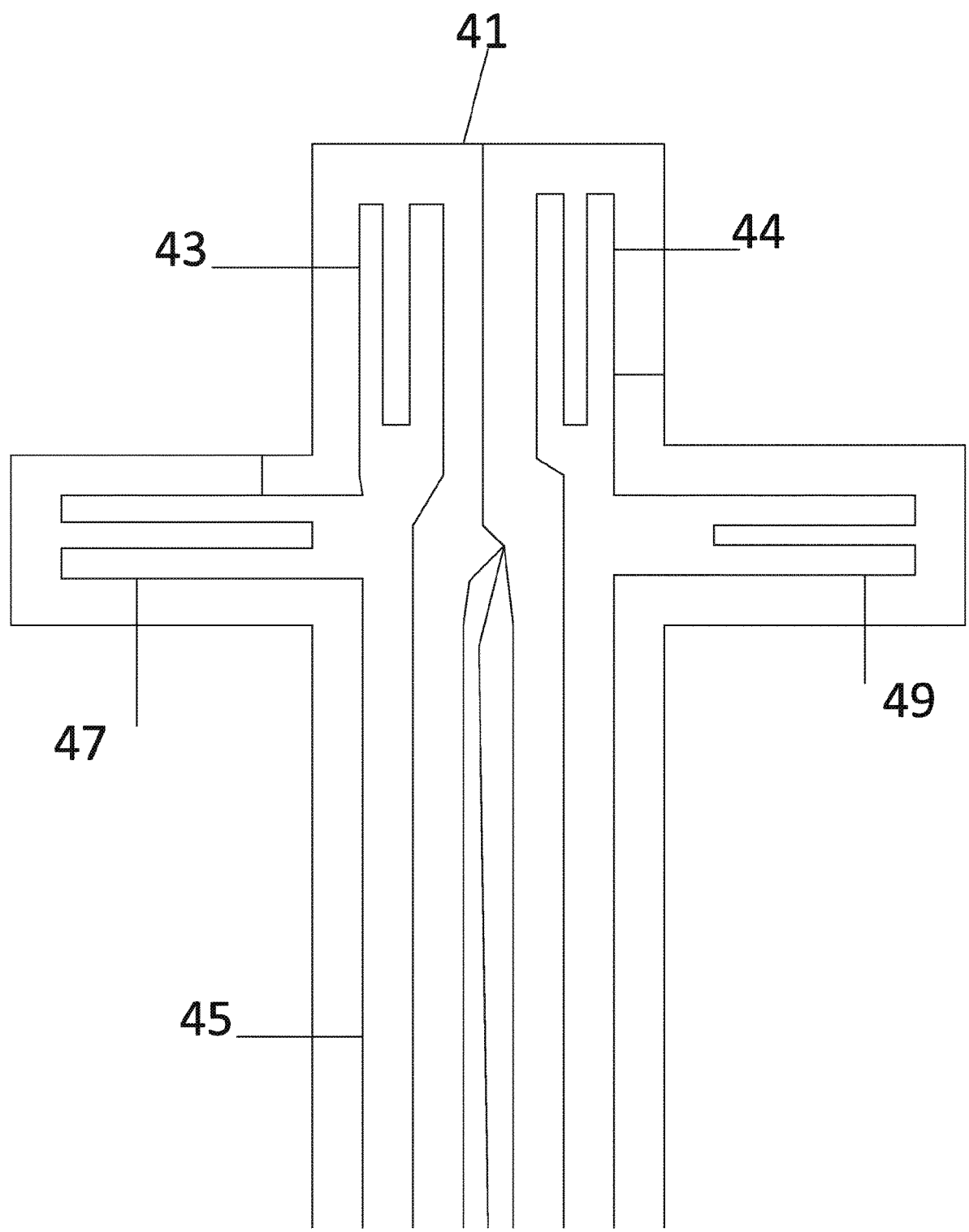
FIG. 5 shows a sensor with four measurement modules in a cross-shaped arrangement.

FIG. 5 shows yet another alternative embodiment, said embodiment having four sensor elements 43, 44, 47, 49. There are five channels, four of which are associated with each of the four sensor elements. Two of the sensor elements 43, 44 may be positioned so as to directly measure axial strain, whilst the other two sensor elements may be positioned so as to measure circumferential strain 47, 49. FIG. 5 may be particularly advantageous because not only are these values directly measured, but there are two measurements for each value, which further reduces the error associated with each measurement. The cross-like shape of the sensor 41 in this configuration may also be advantageous as it may be particularly easy to position on a pipe, and adhere to a pipe such that installation is easy.

It is noted that any of the embodiments shown in FIGS. 3 to 5 may also include a temperature sensing element, or a pressure sensing element. The measurement of such values may be advantageous, as data on such parameters in combination with the strain data may give indications as to the health condition of the pipe. As an additional alternative the sensing elements may be configured to detect acceleration, either of the pipe, or of fluid within the pipe in order to determine the health condition of the pipe. Strain gauges installed at multiple locations on a pipeline can be used to infer general pipeline health, however it may be advantageous to augment the use of strain gauge measurements with other measurements. For example ultrasonic sensors, load cells (to understand the load of the ground on the pipe) and vibro-acoustic sensors may be used. The combination of these sensors with strain gauges may determine a more accurate assessment of the health of the pipeline along its length than the use of strain gauges alone.

Figure 6:
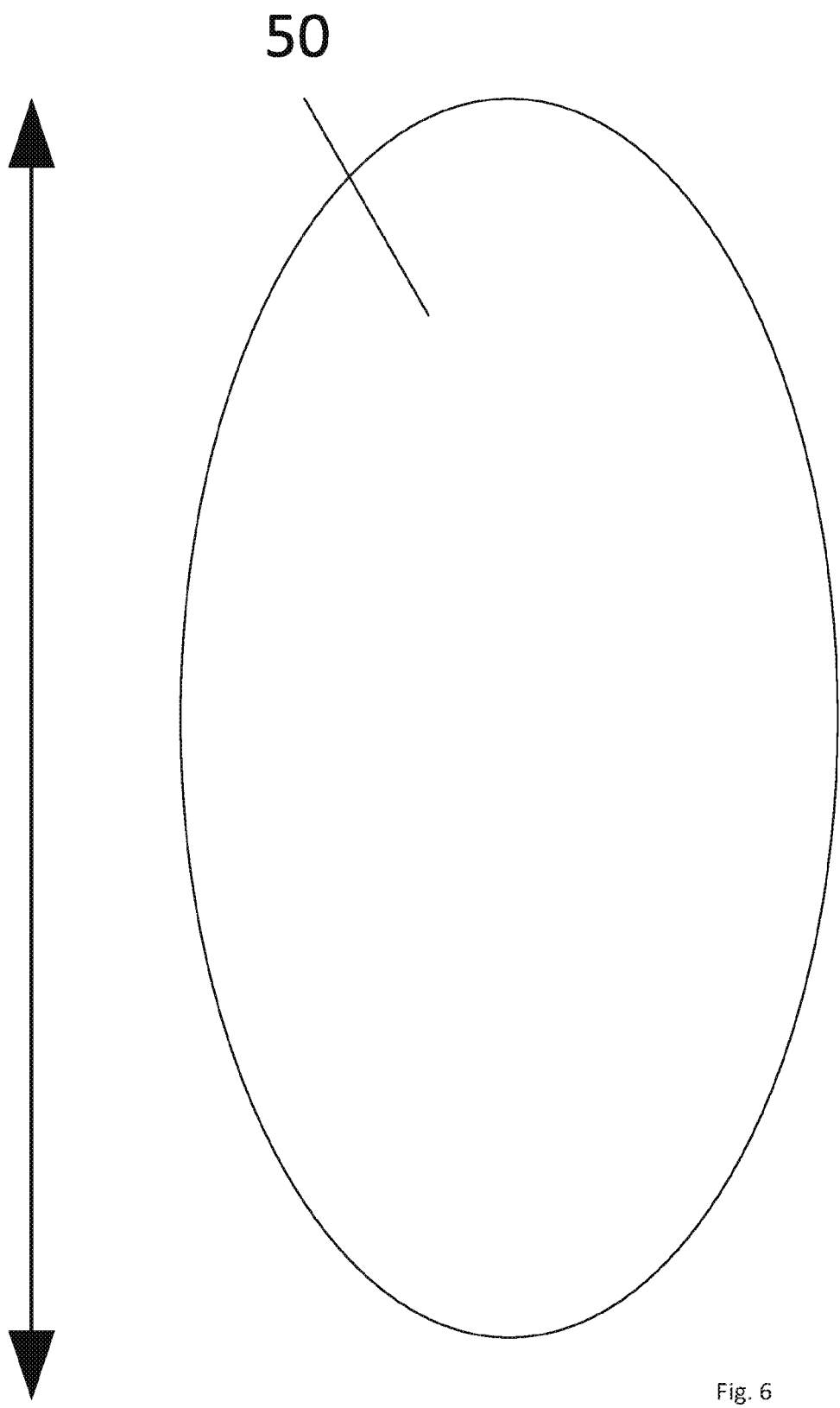
FIG. 6 is a plan view of the base layer of the sensor, demonstrating the flexibility of the base layer of the sensor.

FIG. 6 shows the base layer/substrate 50 of the sensor onto which the circuitry may be printed. The substrate 50 may be any shape, and an oval is shown for simplicity alone. Also shown is an arrow indicating that the substrate is being stretched, or flexed. That is one or more forces are deforming the sensor substrate 50. The sensor however is only deforming elastically, rather than plastically, and so will return to its original shape.

The substrate 50 shown in FIG. 6 has a poisson's ratio of 0.37-0.44 such that the sensor is configured to elastically deform under dynamic and static loading over a period of time. This means that the sensor will behave elastically for these time periods under these forces. This compares with traditionally strain gauges that will deform plastically at much lower forces, or for lower periods of time. This allows ease of installation to be increased as the person installing the sensor does not have to be careful not to deform the sensor, and allows installation requiring brief deformation to take place without fear of damaging the sensor.

The use of conformable substrates also allows the circuitry to be printed directly onto the substrate 50, such that the sensor elements do not have to be formed from traditionally metal wires. Such wires are liable to breakage, and can make attaching the sensor to external circuitry particularly fiddly, and difficult to use. The printed circuitry enables the connection to be made easily, and the deformable nature of the substrate aids with installation. Moreover, during use earth around the pipe may slip slightly, and therefore compress, or distort the sensor. Traditional sensors would be hampered in such an environment and would likely fail. However, the use of the conformable substrate means that the present sensor may withstand such deformation, and so enable the use of the claimed sensors in subterranean environments.

Figure 7:
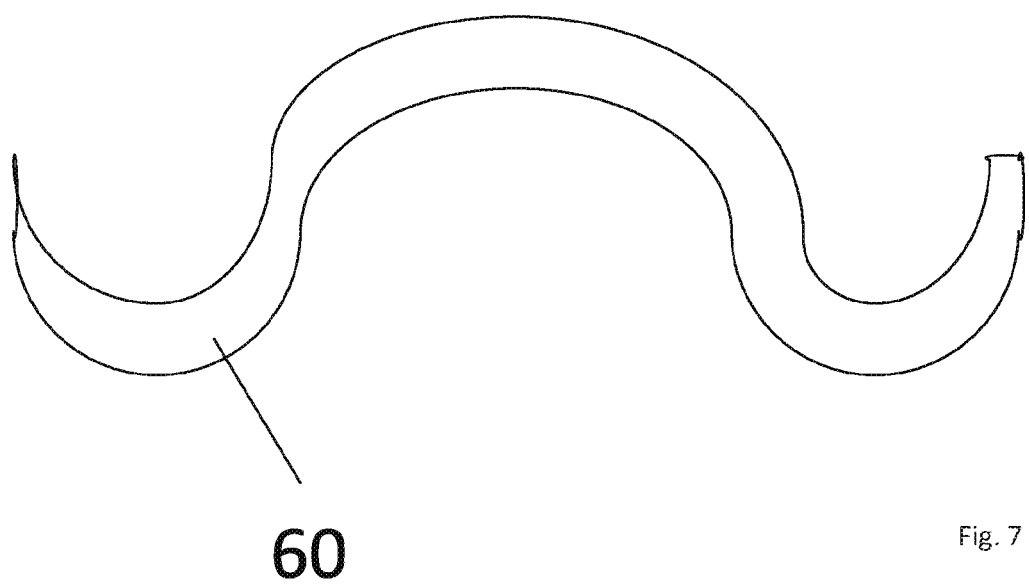
FIG. 7 is a cross-sectional view of the base layer of the sensor when the base layer of the sensor is compressed to demonstrate its flexibility.

FIG. 7 is a cross-sectional view of the substrate 60 of the sensor whilst a compressive force is applied to both sides of the substrate of the sensor. This shows that the sensor deforms by bending to create wave-like folds. For such folds may be sinusoidal in shape, or may comprise other such folds. Due to the nature of the sensor substrate 60 the flexibility ensures that the sensor does not break when exposed to such forces and compressions.

It is also noted that the sensor may further comprise a protective layer to encase the ink trace. The protective layer is similarly deformable, such that both the protective layer, and the flexible plastic, or metallised plastic base layer are flexible as described above.

The sensor substrate 60, or base layer, may be formed from polyethylene terephthalate, polyaryletherketone or polyimide.

An alternative to the sensor described above may comprise foil strain gauges such as those provided by HBM and Omega. The performance of these strain gauges are known from manufacturers datasheets, and therefore the signals sent by the strain gauges can be readily understood. These devices may also be well encapsulated so that they can withstand moist and high pressure environments.

Figure 8:
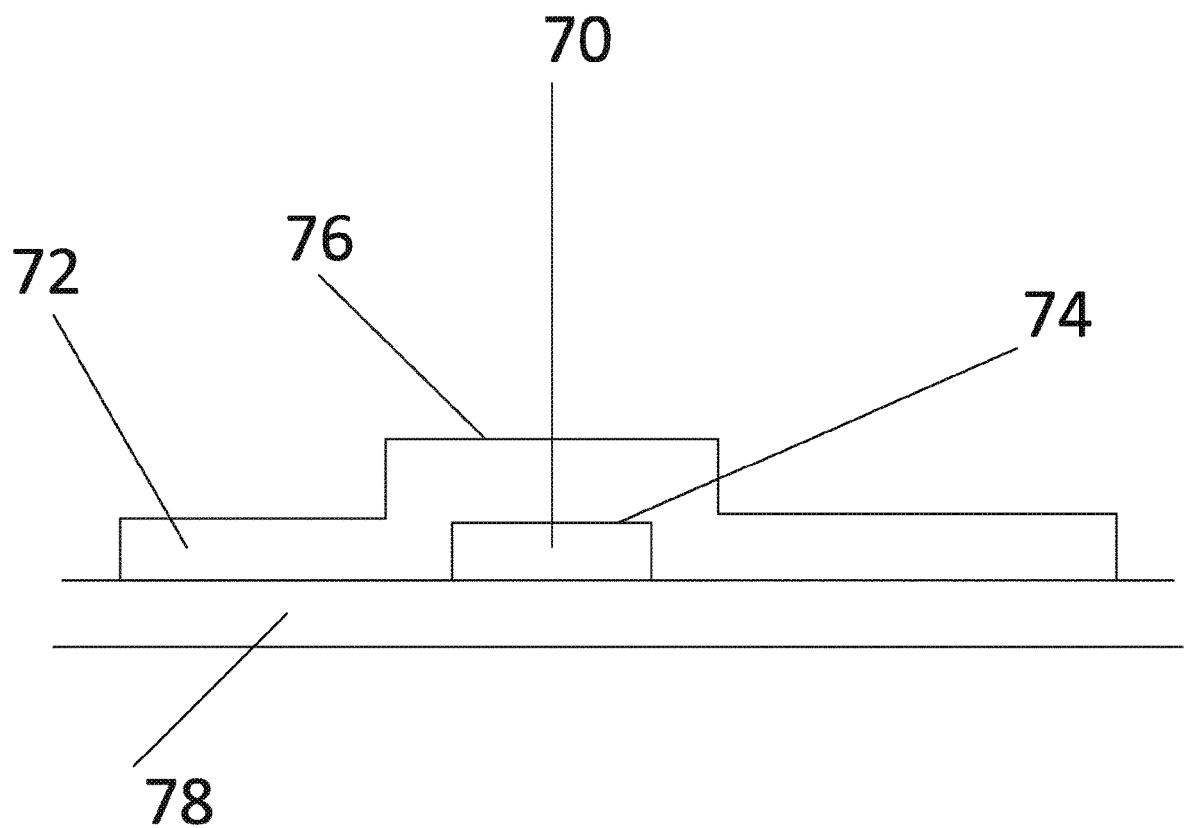
FIG. 8 shows an attachment pad and a sensor in situ on a pipe.

FIG. 8 shows a single sensor 70 applied to a pipe 78, and protected by a single attachment pad 72, also adhered to the pipe 78. This arrangement is shown in cross section, along the length of the pipe 78. The arrangement shown in FIG. 8 is the alternative to that shown in FIG. 2, such that the side opposite the indent 74 is not flush, and instead features a raised portion 76. Sensors 70 may be installed at multiple sections of pipe 78 that is part of a pipeline. Measurements form each section of a pipe 78 may aid in determining the health of the pipeline.

FIG. 8 shows the sensor 70 directly attached to the pipe 78 and housed within the indent 74 of the attachment pad 72. The raised portion 76 is aligned with the indent 74 on the other side of the attachment pad. FIG. 8 also shows that the pipe 78 is hollow to allow fluids to flow through the lumen of the pipe 78. In some embodiments the pipe 78 may be comprised of plastic, or alternatively could be metal or another suitable material.

Figure 9:
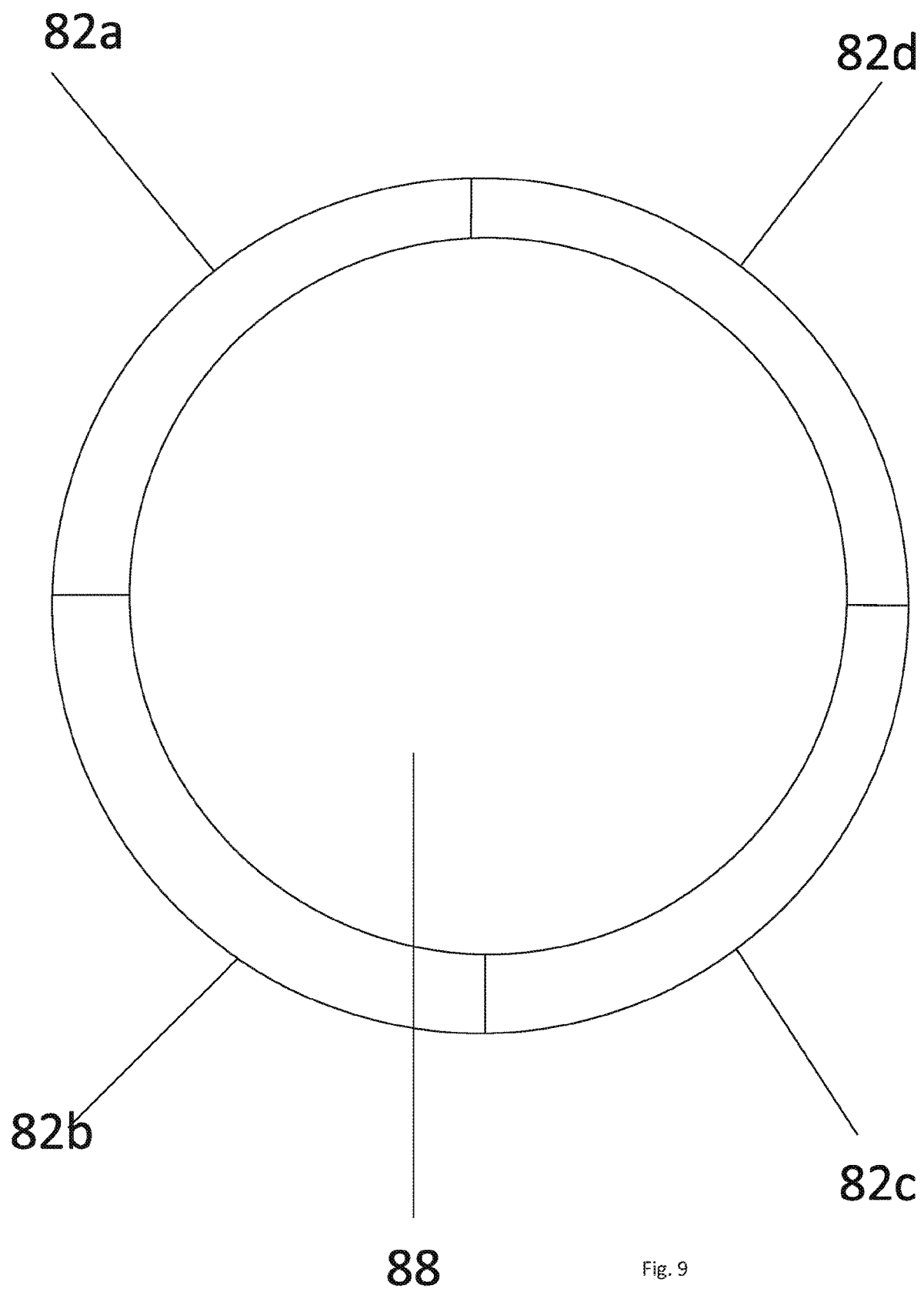
FIG. 9 shows four attachment pads that together span the perimeter of the pipe.
Figure 10:
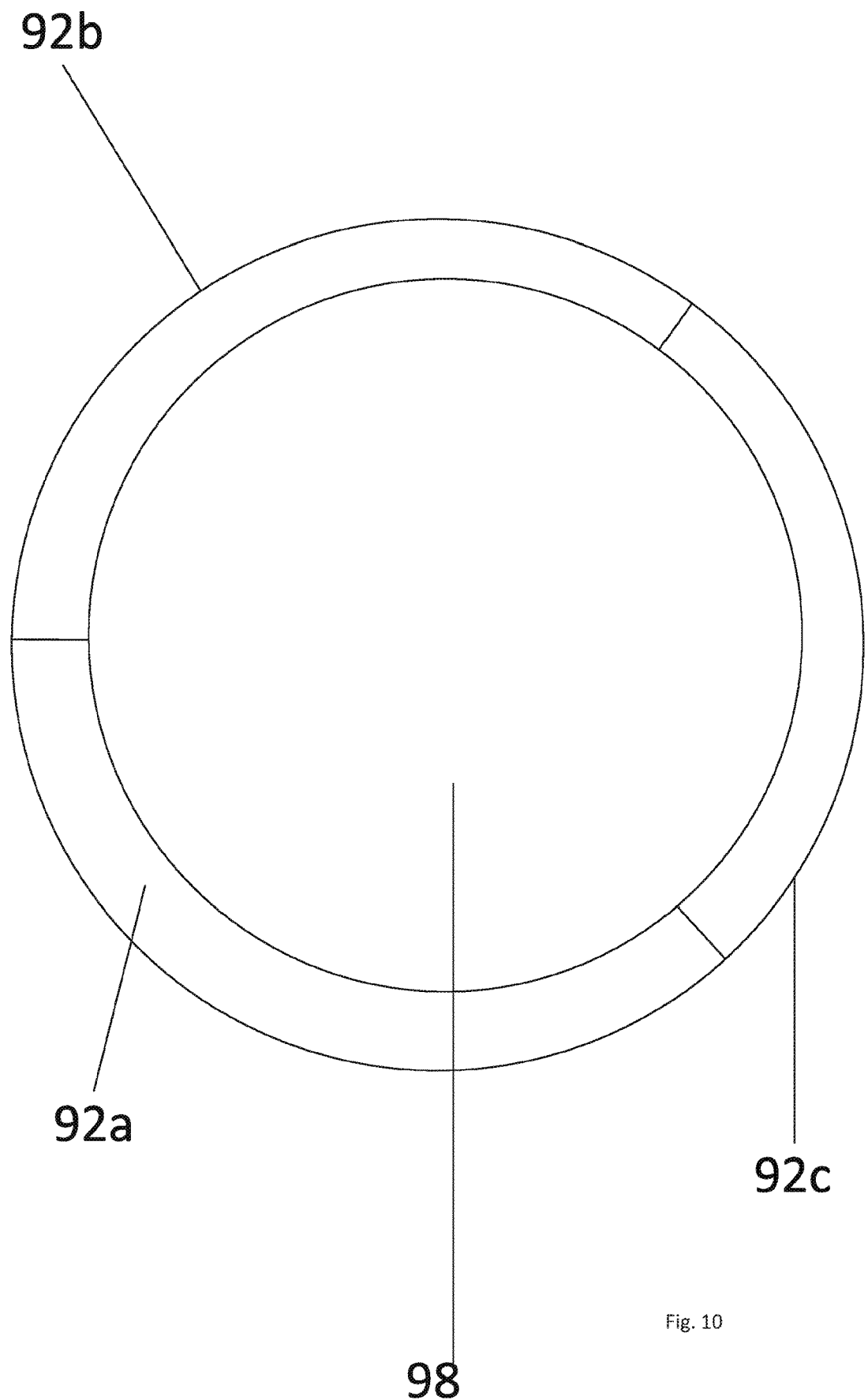
FIG. 10 shows three attachment pads that together span the perimeter of the pipe.

FIG. 9 shows four attachment pads 82 that together span the entire perimeter of the pipe 88. The attachment pads 82 span the entire perimeter once but only once. FIG. 10 also shows that the attachment pads 82 are tessellatable with themselves such that they span the perimeter. It is advantageous to span the perimeter of the pipe 88 such that the entire perimeter of the pipe 88 is protected, and so that any forces exerted on the pipe 88 do not disproportionately affect one area, and so increase strain on the pipe 88. Moreover, the tessellatable nature of the attachment pad 82 is preferable as it allows the entire surface to be covered by using more than one attachment pad 82a, 82b, 82c, 82d. If a single attachment pad 82 were needed to cover the entire surface of the pipe 88 this could represent a challenge in installation, whereas tessellating the pads together ensures that installation is comparatively easier.

It is noted that in other embodiments the pads 82 may not be fully tessellatable such that there may be gaps between the pads 82. This embodiment may not have the technical benefits associated with the tessellation described above, but for embodiments where coverage is not needed across a full pipe 88 circumference may still provide adequate protection for the sensors.

FIG. 10 shows three attachment pads 92 tessellated together to span the entire perimeter of the pipe 98. This is an alternative configuration to the one shown in FIG. 9 in which four attachment pads 82 were used. This may be advantageous for smaller pipes 98, or for configurations in which three sensors are used on the pipe 98. Any number of attachment pads 92 may be used to span the entire perimeter of the pipe.

It is noted that the sensors are not shown in FIGS. 9 and 10, and nor are the indents or raised portions of the attachment pad 92.

Figure 11:
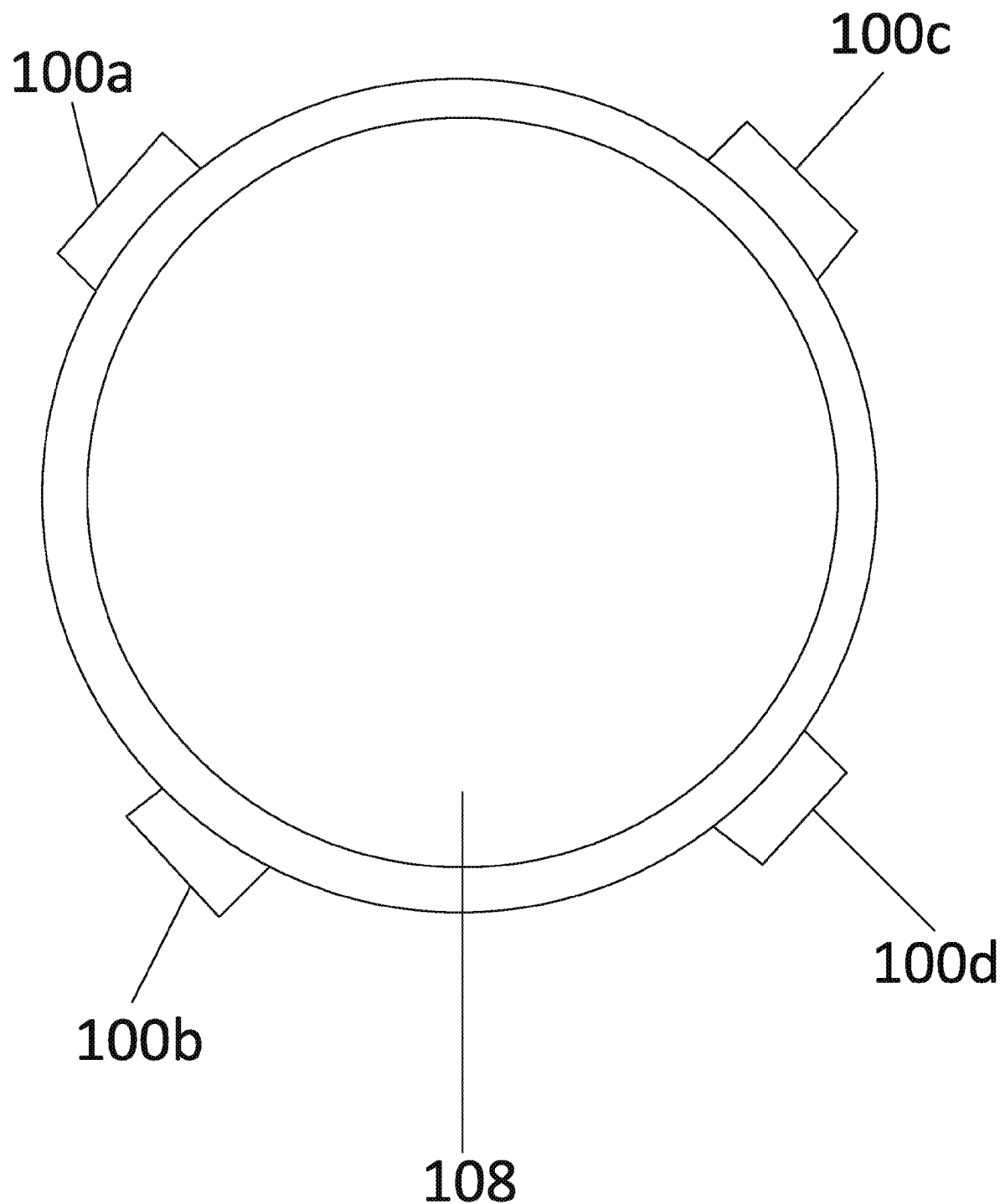
FIG. 11 shows four sensors attached to the pipe in one sensor arrangement. The attachment pads are not shown.

FIG. 11 shows four sensors 100a, 100b, 100c, 100d situated on a pipe 108. The Figure shows the arrangement in cross section. The attachment pads are not shown in FIG. 11. The top two sensors 100a, 100c in FIG. 11 are equidistant to the top of the pipe 108. The top of the pipe 108 is defined as the portion of the pipe 108 that is closest to the ground. In this case the top of the pipe 108 corresponds with the top of the pipe 108 as shown in the Figure. Indeed in FIG. 11 all four of the sensors 10a, 100b, 100c, 100d are equidistant each other, such that the axis between them forms an "X" shape across the cross-section of the pipe 108. The arrangement shown in FIG. 11 is advantageous as it allows the top of the pipe 108 to be accessed for essential maintenance without the need to remove a sensor 100 from its position on the pipe 108. Moreover, the sensors 100 being equidistant one another ensures that the sensors 100 measure the strain accurately, such that any strain events are captured. For example, it would be expected that should there be axial strain that having four sensors 100 equidistant one another the likelihood of detecting such an event is increased and indeed maximised.

Figure 12:
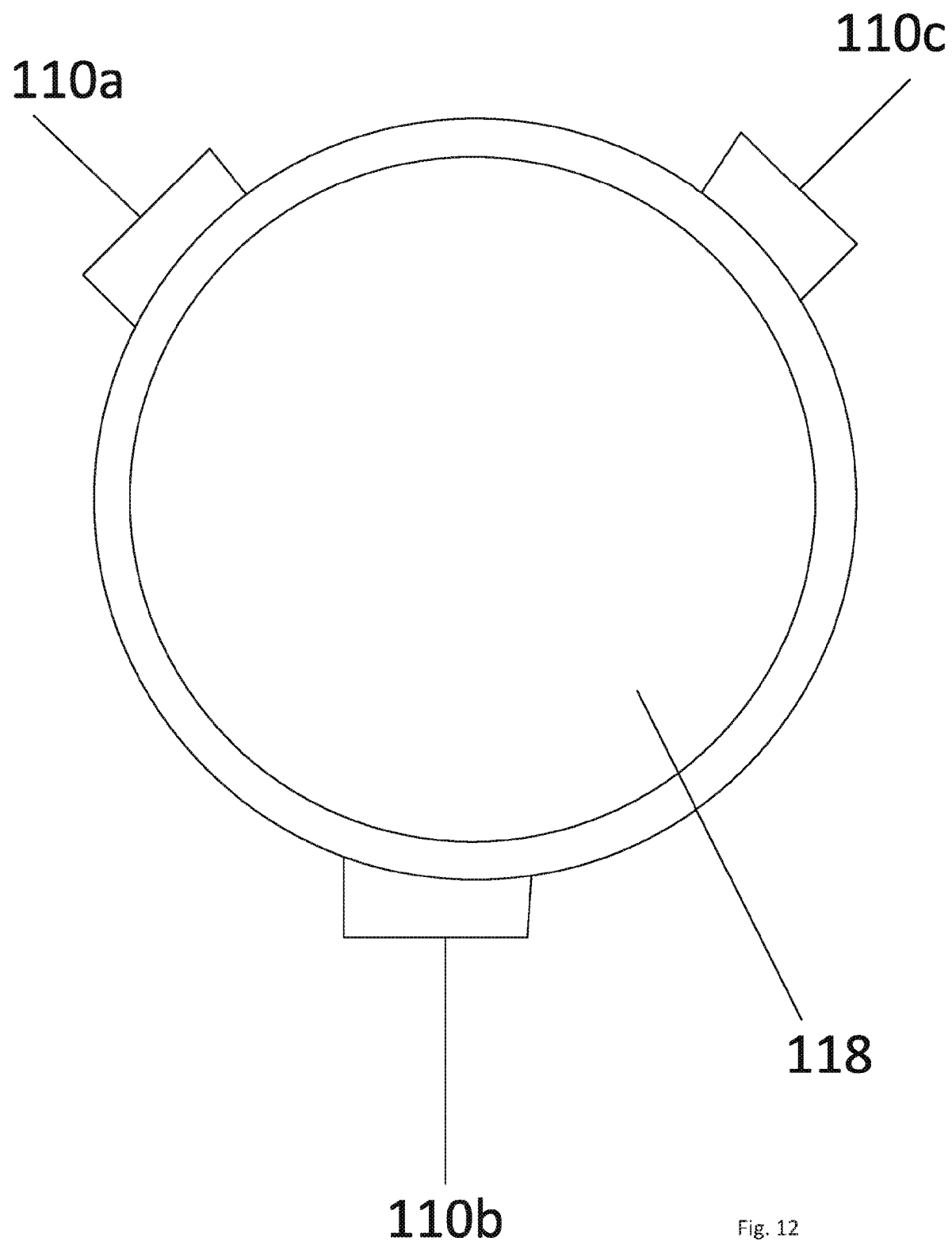
FIG. 12 shows three sensors attached to the pipe in one sensor arrangement. The attachment pads are not shown.

FIG. 12 shows an alternative arrangement in which three sensors 110a, 110b, 110c are situated on a pipe 118. Once more the three sensors 110 are positioned equidistant one another, and the sensors 110a, 110c nearest the top of the pipe 118 are equidistant the top of the pipe 118, and the top of the pipe 118 is kept clear for essential maintenance work. Any number of sensors 110 may be used to measure the strain of the pipe accurately. The arrangement shown in FIG. 12 is advantageous as it allows the top of the pipe to be accessed for essential maintenance without the need to remove a sensor from its position on the pipe 118. Moreover, the sensors 110 being equidistant one another ensures that the sensors 110 measure the strain accurately, such that any strain events are captured. For example, it would be expected that should there be axial strain that having three sensors equidistant one another the likelihood of detecting such an event is increased and indeed maximised.

Figure 13:
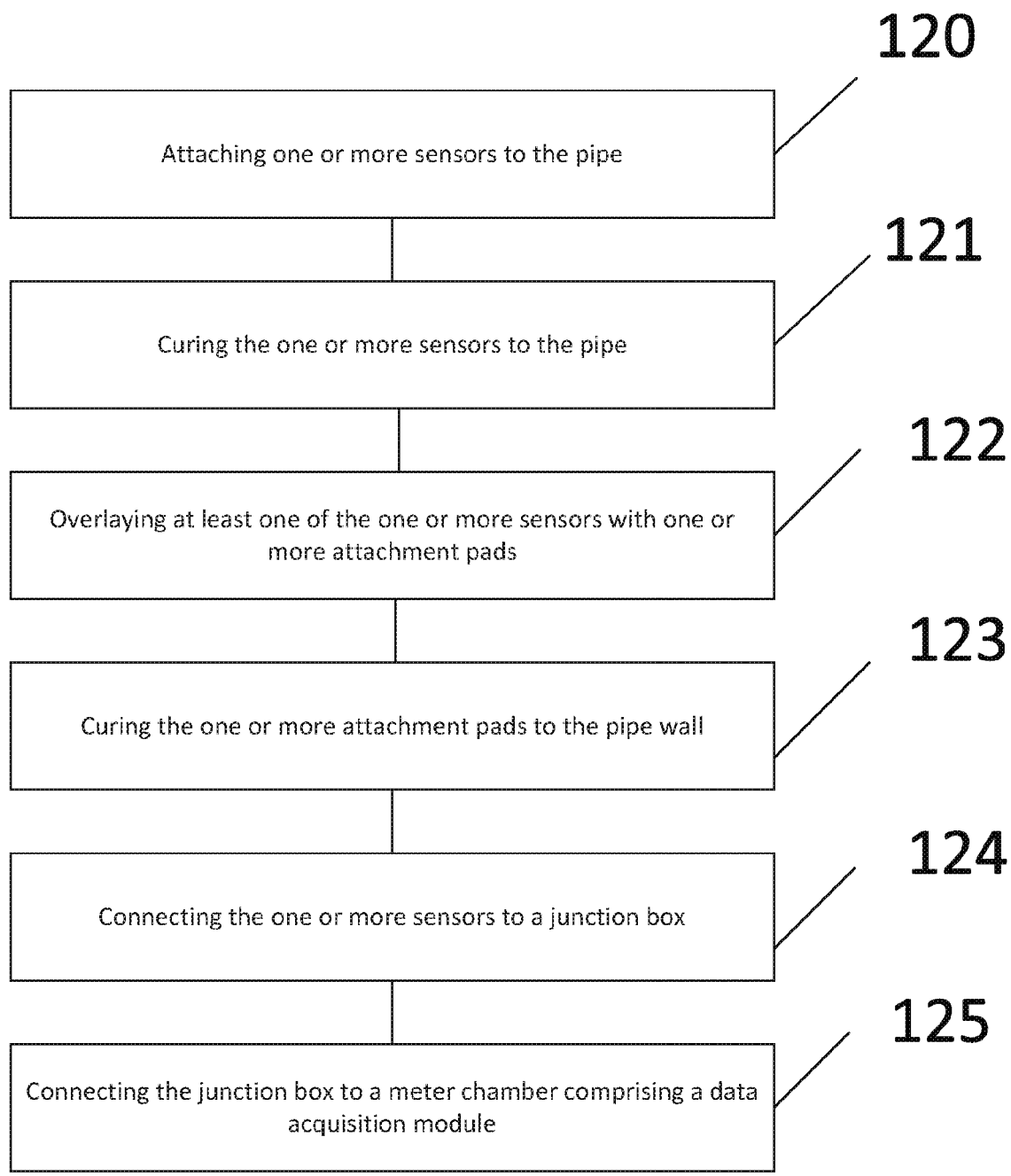
FIG. 13 shows the steps of installation for the sensors on the pipe.

FIG. 13 shows a flowchart detailing steps that may be taken in the installation of the sensors on a pipe. It is noted that not all of the steps shown are essential to the method of installation, and FIG. 13 shows merely one embodiment of a method of installation that may be used.

Installation may be undertaken by attaching one or more sensors to a pipe, and overlaying one or more attachment pads over said sensors.

The first step 120 in FIG. 13 comprises attaching one or more sensors to the pipe. These sensors may be applied individually, or as a pack at the same time. This attachment may be achieved through the use of an adhesive, or by the use of friction of the sensor on the pipe alone. Alternatively mechanical ties or other mechanical links may be used to attach the sensors to the pipe.

The second step 121 is optional and comprises curing the one or more sensors to the pipe. The curing step may comprise exerting a force on the sensor to use pressure to cure the sensor to the pipe. Alternatively the sensor may be cured to the pipe through the application of temperature. In some embodiments both temperature and pressure may be used in the curing process.

The third step 122 of FIG. 13 comprises overlaying at least one or more of the sensors with one or more attachment pads. The attachment pad may completely overlie the sensor, or may partially overlie the sensor. The attachment pad may have an indent to house the sensor, and the sensor may be partially or fully housed within the indent. The attachment pad may have a raised portion in line with the indent. Overlying the sensor with the attachment pad protects the sensor from external forces and moisture.

The fourth step 123 is optional and comprises curing the one or more attachment pads to the pipe surface. The curing step may comprise exerting a force on the attachment pad to use pressure to cure the attachment pad to the pipe. Alternatively the attachment pad may be cured to the pipe through the application of temperature. In some embodiments both temperature and pressure may be used in the curing process. Alternatively the attachment may be achieved by electrofusion welding.

The fifth step 124 is optional and comprises connecting the one or more sensors to a junction box. A junction box is a connection hub that is configured to receive signals. Connecting the one or more sensors to the junction box enables the sensors to send measured data to the junction box. The junction box may be particularly advantageous if multiple sensors are used as it may serve as a connection point for receiving signals from all of the sensors, such that all of the data is collected at a single point. It is also noted that sensors may connect via a wireless protocol such as Bluetooth or Wi-Fi instead of through the use of a wired connection to a junction box. In yet another embodiment a junction box is not used and instead each of the sensors is directly connected with a meter chamber.

The final step 125 is similarly optional and comprises connecting the junction box to a meter chamber comprising a data acquisition module. The meter chamber may also comprise a power source such as a battery, or a mains connection in order to power the data acquisition module. The power may also feed the sensors, although in some iterations the sensors may have their own in-built power sources. The meter chamber may be designed to stop the ingress of moisture into the data acquisition module. The data acquisition module acquires data from the sensors. The data acquisition module may process the data locally to determine the health condition of the pipe, or alternatively may transmit the data elsewhere for further processing.

It is noted that each of the optional features may be removed from the method shown in FIG. 13. Therefore any combination of remaining features is envisaged as a method within the present disclosure.

Figure 14:
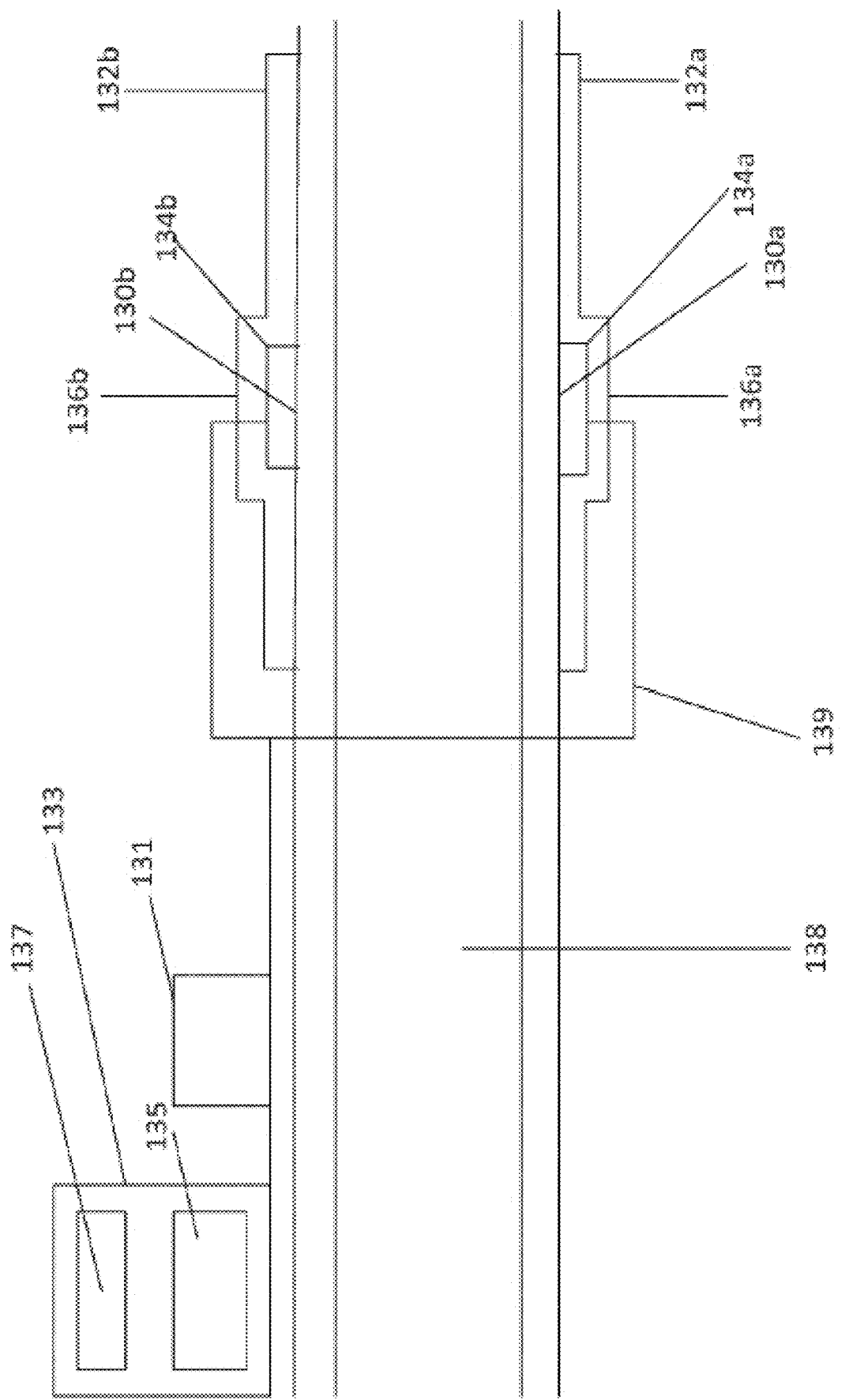
FIG. 14 shows the system of the sensors attached to the pipe, with the junction box and meter chamber in use.

FIG. 14 is an illustration of the system for measuring a parameter of a pipe 138. FIG. 14 includes many optional features and is an illustration of one embodiment of such a system.

FIG. 14 shows a cross section of a pipe 138 with two sensors 130a, 130b mounted either side of the pipe 138. Attachment pads 132a, 132b overlie the sensors 130a, 130b, such that the indent 134a, 134b of the attachment pads 132 houses the sensors 130. The attachment pads 132 have a raised section 136a, 136b in line with the indent 134. The thickness of the attachment pad 132 is substantially uniform. The outputs 139 of the sensors are fed through the attachment pads 132 and join together and are connected to a junction box 131. The junction box 131 is in turn connected to a meter chamber 133. The meter chamber 133 houses a data acquisition module 135 and a power source 137.

The attachment pad 132 may be connected to the pipe 138 by adhesive. Alternatively the attachment pad 132 may be cured to the pipe 138 without the use adhesive. Alternatively there may be sufficient friction between the attachment pad 132 and the pipe 138 to keep the attachment pad in situ. Similarly the sensor 130 may be attached with adhesive, through curing, or by the use of friction.

The data acquisition module 135 is configured to be in communication with at least one sensor 130 to receive data, the data acquisition module 135 configured to process the data to determine one or more properties of the pipe 138. This may be as shown in FIG. 14 via the junction box 131, or a direct connection between the data acquisition module 135 and the sensors 130 may be made. The data acquisition module 135 may determine the one or more properties of the pipe 138, or may send this data to an external device for further processing.

The meter chamber 133 is configured to be weatherproof, such that data acquisition module 135 is not affected by ground water. The power source 137 may be mains or a local source such as a battery.

Although not shown in FIG. 14 the system may further comprise a pressure sensor. The pressure sensor may be tapped into the pipe 138 in the method of installation, or may be installed separately. Preferably the pressure sensor is located adjacent to one or more sensors 130 such that the pressure may be pressured at a point at which a further property of the pipe 138, such as strain is measured. These values may be used to determine the health condition of the pipe 138. The pressure sensor may measure the pressure of fluid within the pipe 138, or pressure on the surface of the pipe 138, or within the wall of the pipe 138 itself. The tapping may be achieved by first boring a hole into the pipe 138, or by tapping the sensor itself into the pipe 138. The pressure sensor may be located at the top of the pipe 138 (nearest the surface of the ground) so that it may be removed and the tap used for routine maintenance.

Figure 15:
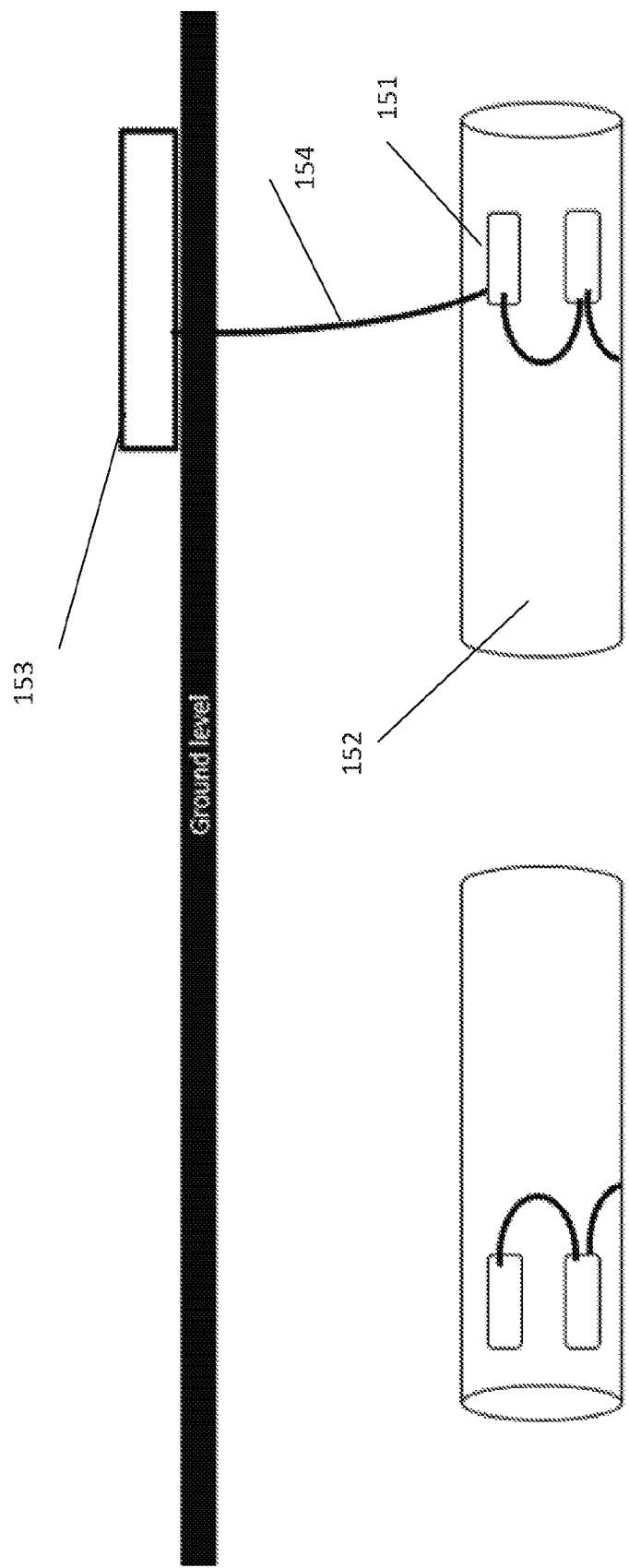
FIG. 15 shows an embodiment of the system in which no junction box is present and the plurality of sensors are arranged in series with one another, and connected directly to the data acquisition module.

FIG. 15 shows an embodiment of the system in which no junction box is present and the plurality of sensors are arranged in series with one another, and are connected directly to the data acquisition module 153 which is positioned above the ground. FIG. 15 shows a plurality of attachment pads 151 attached to a pipe 152, and beneath each attachment pad is at least one sensor. The use of a junction box may have drawbacks as the junction box may be susceptible to the pressure from the earth (and movement in the earth may exert significant forces on the junction box), or from water ingress. In order to remove the junction box from the system in this embodiment the sensors are connected to the data acquisition module directly. In this embodiment there is a single connection 154 between the sensors and the data acquisition module 153. The sensors are therefore connected in series so that only one connection to the data acquisition module is needed. This also provides less points of failure, however if this one connection 154 were to fail then all data transmission from the sensors to the data acquisition module 153 will cease. The connection between the sensors and the data acquisition module may be any suitable connection.

Figure 16:
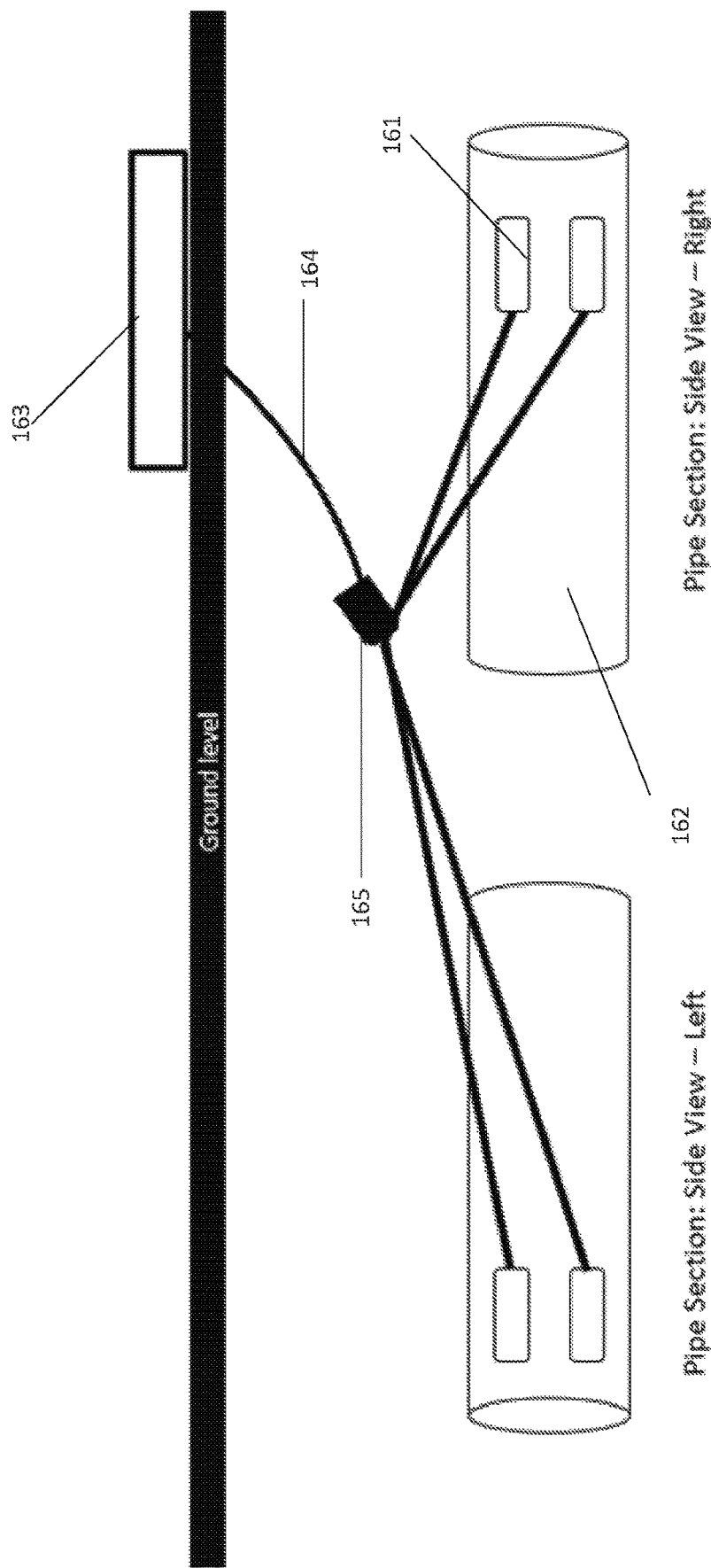
FIG. 16 shows an embodiment of the system in which no junction box is present and the plurality of sensors are arranged in parallel with one another and are connected to the data acquisition module via a connector.

FIG. 16 shows an embodiment of the system in which no junction box is present and the plurality of sensors are arranged in parallel with one another and are connected to the data acquisition module 163 via a connecting element 165. FIG. 16 shows the sensors beneath the attachment pads 161 as described above in relation to FIG. 15. Each sensor is independently connected to the connecting element 165, and then the connecting element has a single connection 164 to the data acquisition module 163. As an alternative some of the connections to the connecting element may be in parallel and some may be in series. Moreover, the connective element may simply position the connections such that they are adjacent one another, but so that each connection still conducts separate signals to the data acquisition module. In the event one connection fails the remainder will still function, and so this is an advantage over the series system described above. However, this system may cost more to implement.

Figure 17:
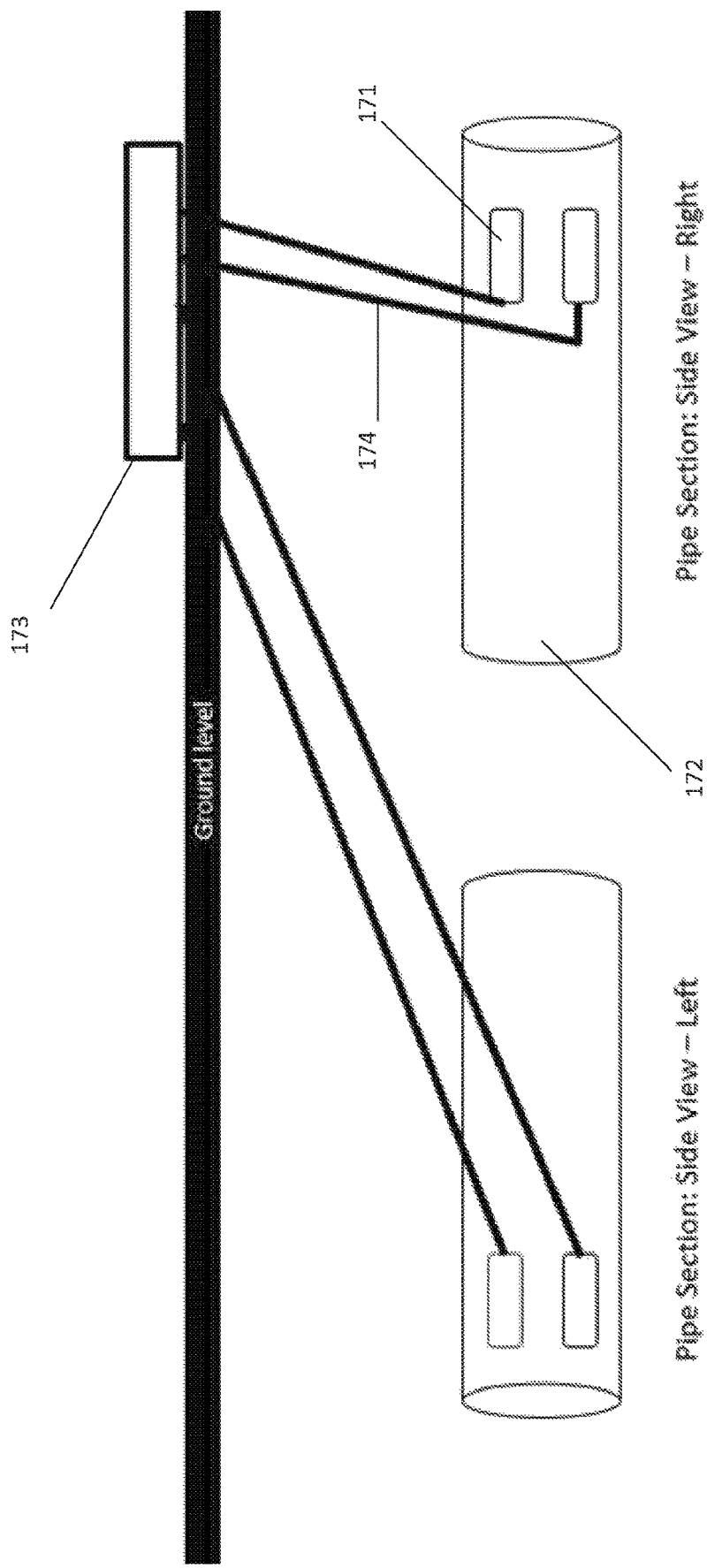
FIG. 17 shows an embodiment of the system in which no junction box is present and the plurality of sensors are arranged in parallel with one another, and are connected directly to the data acquisition module.

FIG. 17 shows an embodiment of the system in which no junction box is present and the plurality of sensors are arranged in parallel with one another, and are connected directly to the data acquisition module 173. The sensors are beneath the attachment pads 171 in FIG. 17. There is no connecting element present in this embodiment. This has the advantage that if one connection fails the remaining connections still transmit data. However this increases the complexity of the system.

Figure 18:
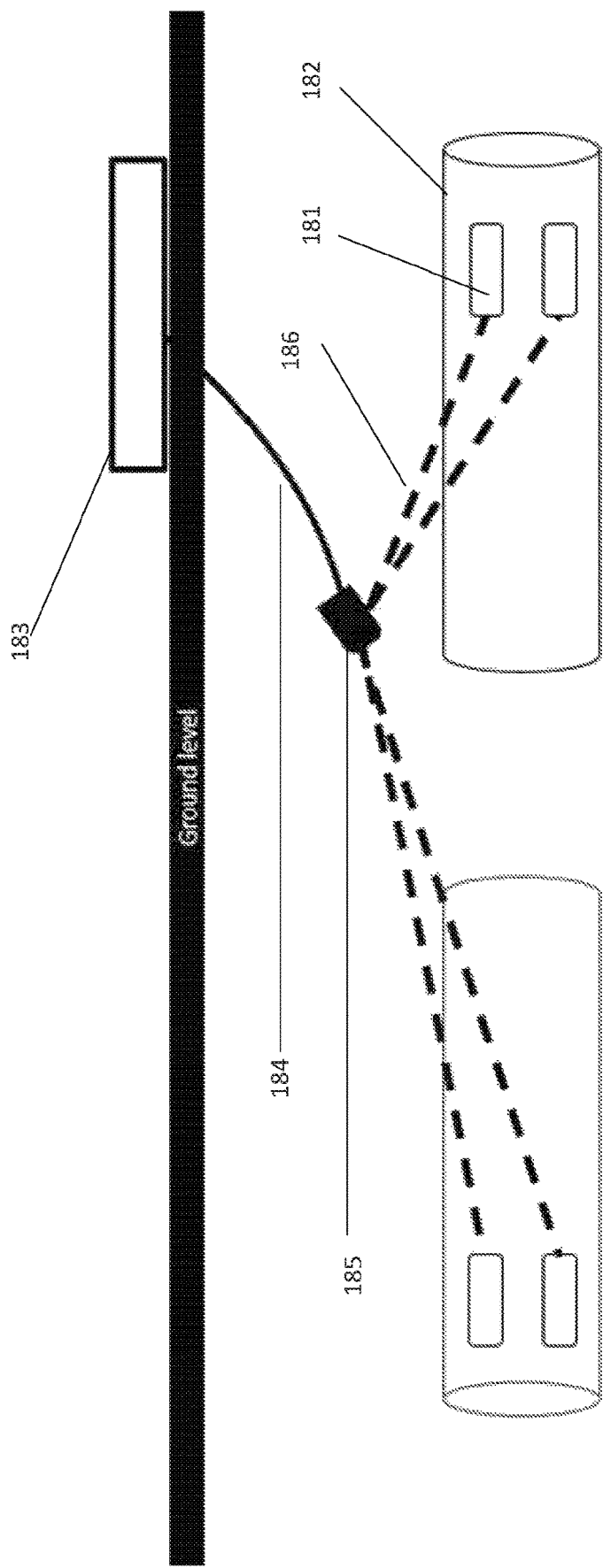
FIG. 18 shows an embodiment of the system in which the junction box is present and the plurality of sensors are arranged in parallel with one another.

FIG. 18 shows an embodiment of the system in which the junction box 185 is present and the plurality of sensors are arranged in parallel with one another. Two types of connections are shown. The first 186 are shown as dashed lines and connect the sensors to the junction box. The second 184 shown in solid line connect the junction box to the data acquisition module 183.

Figure 19:
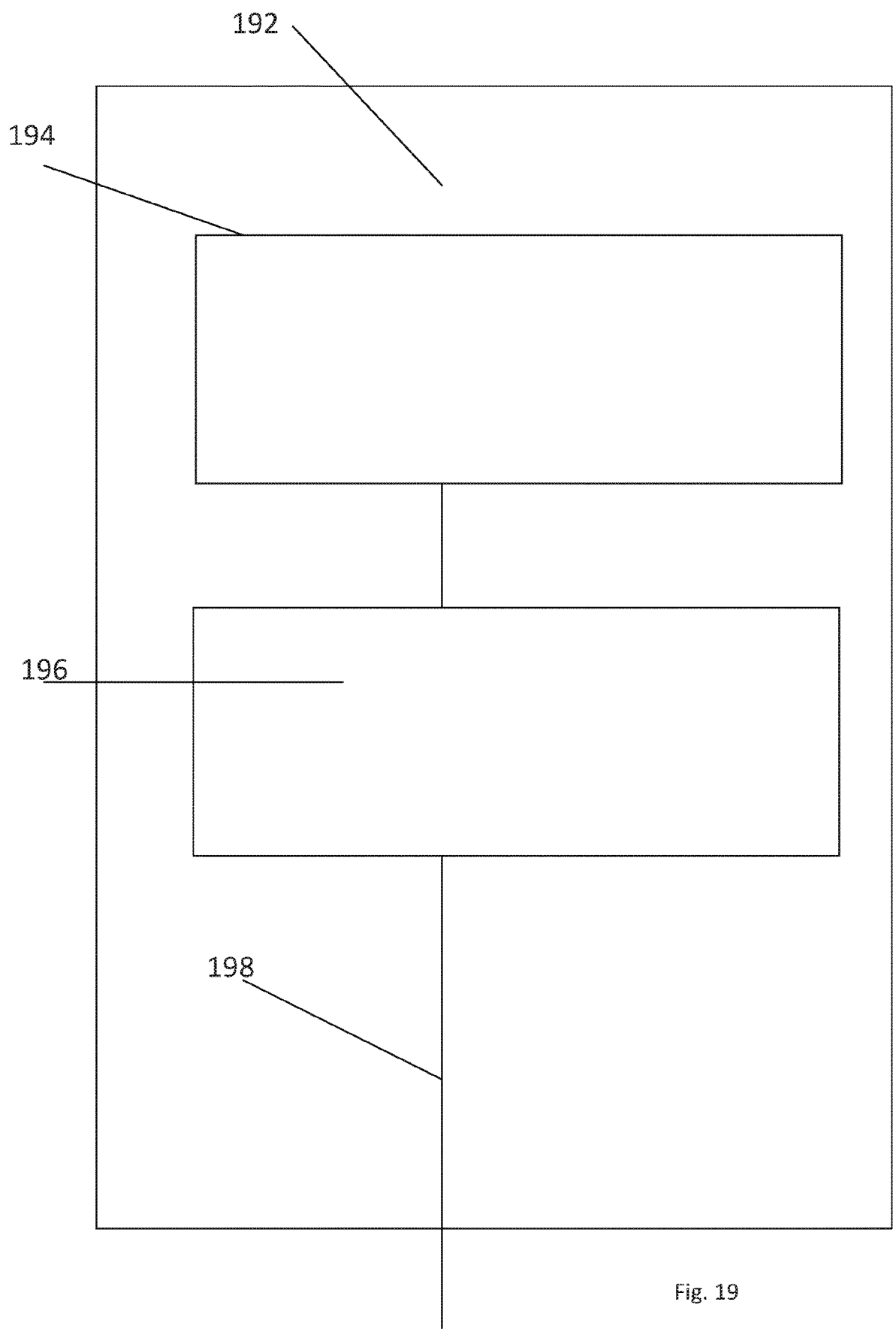
FIG. 19 shows an embodiment in which an analogue to digital converter is positioned adjacent the attachment pad and the sensor.

FIG. 19 shows an embodiment in which an analogue to digital converter 196 is positioned adjacent the attachment pad 192 and the sensor 194. This means that if the sensor 194 is configured to record or send analogue data then the analogue data has to travel only a short distance (of the order of a few centimetres) to reach the analogue to digital converter 196.

Analogue signals are often harder to reconstruct than digital signals once they have been distorted. In the present use case signals may be distorted by vibrations in the earth for example, and therefore some distortion may occur between the sensor and the data acquisition module. Positioning the digital to analogue converter 196 adjacent the sensor 194 and the attachment pad 192 may therefore increase the quality and/or usefulness of the signals that are received by the data acquisition module.

The analogue to digital converter 196 may be directly coupled with the sensor 194. They two elements may be manufactured together. The attachment pad 192 may contain a second recess for the analogue to digital converter, or alternatively the first recess may be large enough to encompass both the sensor and the analogue to digital converter. The recess or recesses may be potted with silicone to reduce forces transmitted to the analogue to digital converter or the sensor. The attachment pad may be moulded directly over the sensor, and optionally over the digital to analogue converter 196 during manufacture. The analogue to digital converter 196 may for example be miniaturised and may be situated on a multilayer PCBA or a flexible substrate.

The invention extends to methods, system and apparatus substantially as herein described and/or as illustrated with reference to the accompanying figures.

The invention also provides a computer program or a computer program product for carrying out any of the methods, processes or determinations described herein, and/or for embodying any of the apparatus features described herein, and a computer readable medium having stored thereon a program for carrying out any of the methods, processes or determinations described herein and/or for embodying any of the apparatus features described herein.

The invention also provides a signal embodying a computer program or a computer program product for carrying out any of the methods described herein, and/or for embodying any of the apparatus features described herein, a method of transmitting such a signal, and a computer product having an operating system which supports a computer program for carrying out the methods described herein and/or for embodying any of the apparatus features described herein.

Any feature in one aspect of the invention may be applied to other aspects of the invention, in any appropriate combination. In particular, method aspects may be applied to apparatus aspects, and vice versa. As used herein, means plus function features may be expressed alternatively in terms of their corresponding structure, such as a suitably programmed processor and associated memory.

Furthermore, features implemented in hardware may generally be implemented in software, and vice versa. Any reference to software and hardware features herein should be construed accordingly.

It should be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. An attachment pad configured to limit the ingress of moisture into the vicinity of a one or more sensors attached to a pipe, the attachment pad configured to overlie the one or more sensors such that the one or more sensors may be positioned between the pipe and the attachment pad, the attachment pad having a first face and a second face, and wherein the first face comprises an indent configured to house at least one sensor when the at least one sensor is coupled to the pipe.

2. The attachment pad of claim 1, the second face having a raised portion, aligned with the indent.

3. The attachment pad of claim 1, wherein the attachment pad has a thickness of 1 mm, preferably the thickness being in the range of 1 mm to 10 mm.

4. The attachment pad of claim 1, wherein the attachment pad is formed of a resilient material, such that the attachment pad is more resilient than the sensor.

5. The attachment pad of claim 1, wherein one or more attachment pads are sufficient to span the entire perimeter of the pipe.

6. The attachment pad of claim 1, wherein the attachment pad is tessellatable with itself such that two or more attachment pads may span the entire perimeter of the pipe.

7. The attachment pad of claim 1, wherein the attachment pad is configured to be adhered to the pipe by adhesive, and/or wherein the attachment pad is curable/weldable to adhere to the pipe and/or wherein the attachment has a sufficient level of friction with the pipe such that adherence between the pipe and the attachment pad is caused.

8. The attachment pad of claim 1, wherein the attachment pad is configured to house an analogue to digital converter configured to convert an analogue signal measured by the sensor into a digital signal.

9. A system for determining one or more properties of the pipe, the system comprising:
the attachment pad of claim 1; and
the one or more sensors of claim 1; wherein the one or more sensors are configured to be coupled to the outside of the pipe wall.

10. The system of claim 9, further comprising a data acquisition module configured to be in communication with the one or more sensors to receive data, the data acquisition module configured to process the data to determine one or more properties of the pipe.

11. The system of claim 10, further comprising two or more sensors connected to the data acquisition module, wherein the two or more sensors are connected to the data acquisition module by at least one of:
direct connections between the two or more sensors and the data acquisition module, wherein the direct connections are in parallel with one another;
direct connections between the two or more sensors and the data acquisition module, wherein the direct connections are in series with one another;
connections between the two or more sensors and the data acquisition module, wherein said connections are via a connecting element, and wherein the connections between the two or more sensors and the connecting element are in parallel with each other;
connections between the two or more sensors and the data acquisition module, wherein said connections are via a connecting element, and wherein the connections between the two or more sensors and the connecting element are in series with each other.

12. The system of claim 9, further comprising a junction box configured to be connected to the one or more sensors, such that data measured by the one or more sensors can be communicated to the junction box, and preferably further wherein the data acquisition module is configured to be in direct communication with the junction box, preferably wherein the data acquisition module is housed within a meter chamber, preferably wherein the meter chamber is machined to make cable accessibility straightforward, and is configured to be weatherproof, such that the data acquisition module is not affected by groundwater, and preferably wherein the meter chamber further comprises a power subsystem to power the data acquisition module.

13. The system of claim 9, further comprising a pressure sensor configured to be tapped into the pipe in the vicinity of the one or more sensors, to determine the pressure of fluid in the pipe.

14. The system of claim 9, wherein two or more sensors are coupled to the pipe, and further wherein the top of the pipe nearest the ground is free from any sensor, such that it may be accessed for maintenance, and wherein the two or more sensors are equidistant from each other around the circumference of the pipe.

15. The attachment pad as claimed in claim 1 in combination with the pipe, preferably wherein:
the pipe extends from a distal point to a proximal point;
the pipe is configured for fluid to flow through the pipe from the distal point to the proximal point;
the pipe comprises a pipe wall comprising an inside surface and an outside surface; and
a lumen is encapsulated by the inside surface of the pipe wall such that fluid may flow through the lumen;
and preferably further wherein the pipe is coupled to the sensor and the attachment pad, such that the sensor may be positioned between the pipe and the attachment pad.

16. A method of installing the one or more sensors of claim 1 on the pipe of claim 1, comprising attaching the one or more sensors to the pipe, and overlaying at least one of the one or more sensors with the attachment pad of claim 1.

17. The method of claim 16, further comprising curing the one or more sensors such that at least one sensor couples to the pipe wall, preferably wherein curing comprises applying a pressure for a set period of time, and/or wherein curing comprises applying heat for a set period of time.

18. The method of claim 16, further comprising curing the one or more attachment pads to permanently couple the adhesive pads to the pipe wall, preferably wherein curing comprises applying a pressure for a set period of time, and/or wherein curing comprises applying heat for a set period of time.

19. The method of claim 16, further comprising connecting the one or more sensors to a data acquisition module, preferably wherein connecting the one or more sensors to a data acquisition module comprises connecting the one or more sensors to a junction box, and then connecting the junction box to a meter chamber containing a data acquisition module.

20. The method of claim 16, wherein attaching the one or more sensors to the pipe comprises positioning at least one sensor correctly in both the longitudinal and circumferential axis, and/or preferably wherein attaching the one or more sensors to the pipe comprises attaching the one or more sensors to the outer surface of the pipe with an adhesive or epoxy.

* * * * *